United States Patent
Okada et al.

(10) Patent No.: US 7,034,861 B2
(45) Date of Patent: Apr. 25, 2006

(54) PICTURE COMPOSING APPARATUS AND METHOD

(75) Inventors: Tsuyoshi Okada, Yokosuka (JP); Ryosuke Iida, Yokohama (JP); Masato Nishizawa, Yokohama (JP); Katsumasa Onda, Yokohama (JP); Michio Miwa, Urayasu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1105 days.

(21) Appl. No.: 09/899,229

(22) Filed: Jul. 6, 2001

(65) Prior Publication Data

US 2002/0018047 A1 Feb. 14, 2002

(30) Foreign Application Priority Data

Jul. 7, 2000 (JP) ............................. 2000-206495
Jun. 8, 2001 (JP) ............................. 2001-174414

(51) Int. Cl.
*H04N 7/18* (2006.01)
(52) U.S. Cl. ..................... 348/36; 348/148; 348/159
(58) Field of Classification Search ................ 348/36, 348/38, 113, 148, 149, 159; 701/200, 211, 701/300; 340/539.25, 937; 352/69
See application file for complete search history.

(56) References Cited

U.S. PATENT DOCUMENTS 5,289,321 A * 2/1994 Secor ........................ 359/896
5,539,483 A * 7/1996 Nalwa ......................... 353/94
5,686,957 A * 11/1997 Baker ......................... 348/36
6,175,300 B1 * 1/2001 Kendrick ................... 340/436

(Continued)

FOREIGN PATENT DOCUMENTS

JP 05-014751 1/1993

(Continued)

OTHER PUBLICATIONS

Sugiura, et al., "Super-Wide-Angle Cameras by Image Synthesia", IEEE Transactions of consumer electronics IEEE New York, US, vol. 41, No. 2 May 1, 1999, XP000520187.

*Primary Examiner*—Vu Le
(74) *Attorney, Agent, or Firm*—McDermott Will & Emery LLP

(57) ABSTRACT

A picture composing apparatus designed to combine a plurality of images taken by a plurality of image pickup devices. In the apparatus, a first projecting unit projects the plurality of images taken by the image pickup devices onto a projection section in accordance with an image pickup situation of the image pickup devices to generate a plurality of first projected images, and a second projecting unit projects the plurality of first projected images to a three-dimensional projection model to generate a second projected image. Also included in the apparatus are a virtual image pickup device for virtually picking up the second projected image and an image pickup situation determining unit for determining an image pickup situation of the virtual image pickup device, whereby the second projected image is picked up by the virtual image pickup device in the image pickup situation determined by the pickup situation determining unit to combine the plurality of images taken by the plurality of image pickup devices, thus producing a high-quality composite picture. This apparatus can offer a natural composite picture in which joints among the images taken by the image pickup devices do not stand out. In addition, when mounted on a motor vehicle, this apparatus allows a driver to easily seize the surrounding situations and the positional relationship of the motor vehicle with respect to other objects.

26 Claims, 15 Drawing Sheets

U.S. PATENT DOCUMENTS

| | | | |
|---|---|---|---|
| 6,222,447 B1 * | 4/2001 | Schofield et al. | 340/461 |
| 6,226,389 B1 * | 5/2001 | Lemelson et al. | 382/104 |
| 6,304,285 B1 * | 10/2001 | Geng | 348/36 |
| 6,320,612 B1 * | 11/2001 | Young | 348/148 |
| 6,593,960 B1 * | 7/2003 | Sugimoto et al. | 348/148 |
| 6,665,003 B1 * | 12/2003 | Peleg et al. | 348/36 |
| 6,672,745 B1 * | 1/2004 | Bauer et al. | 362/545 |
| 6,788,828 B1 * | 9/2004 | Katayama et al. | 382/284 |
| 2002/0003571 A1 * | 1/2002 | Schofield et al. | 348/148 |
| 2003/0103141 A1 * | 6/2003 | Bechtel et al. | 348/148 |

FOREIGN PATENT DOCUMENTS

| | | |
|---|---|---|
| JP | 06-020189 | 1/1994 |
| JP | 09-322040 | 12/1997 |
| JP | 9-322040 | 12/1997 |
| JP | 2000-134537 | 5/2000 |

* cited by examiner

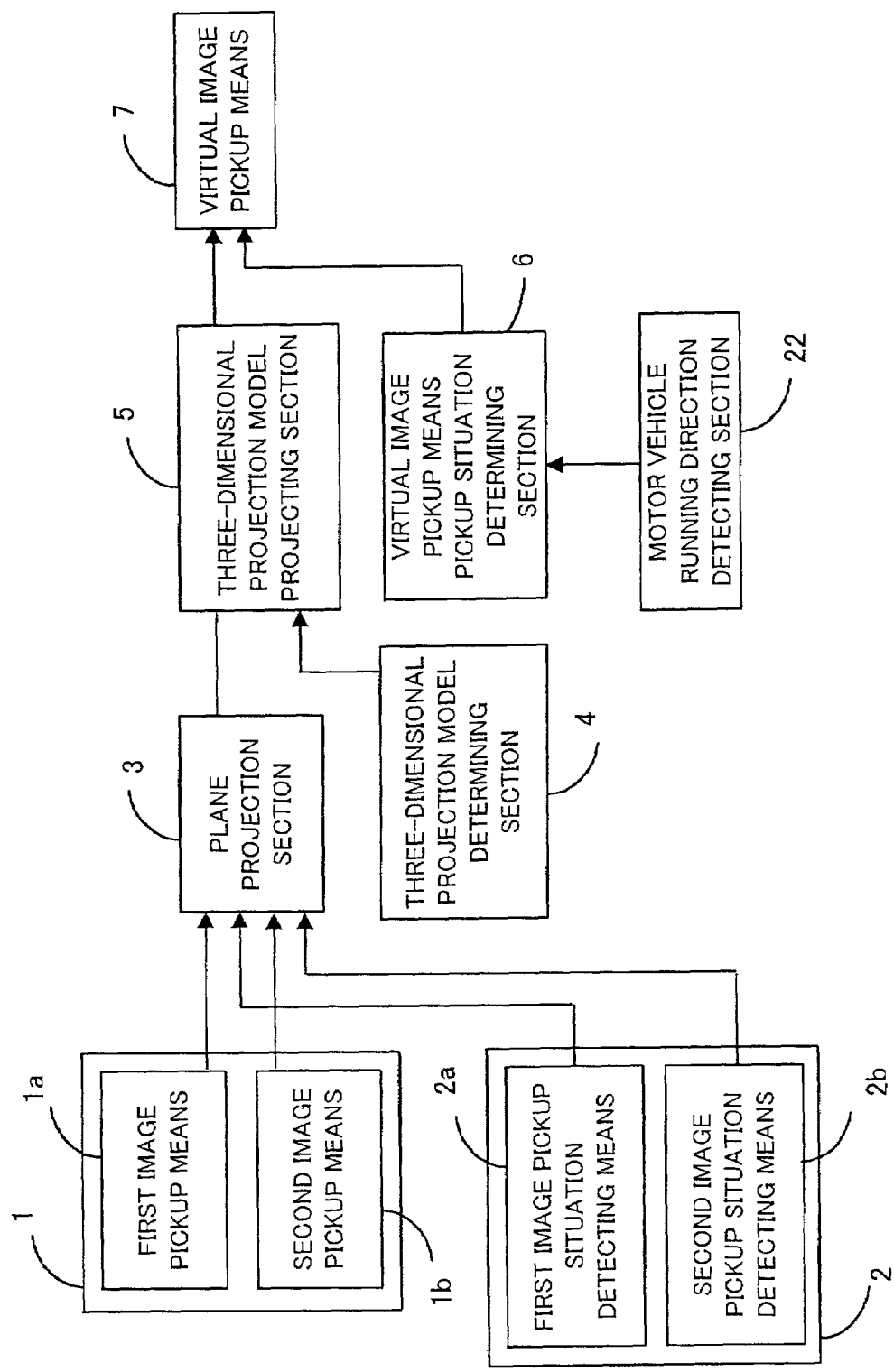

VEHICLE BODY END PORTION

VEHICLE BODY
END PORTION

SIDE SURFACE OF MOTOR VEHICLE

PICTURE COMPOSING APPARATUS AND METHOD

BACKGROUND OF THE INVENTION

1) Field of the Invention

The present invention relates to a picture composing apparatus and method, and more particularly to a picture composing apparatus and method suitable for use in a system designed to convert/combine images acquired through the use of a plurality of image pickup means mounted in a motor vehicle for showing an image around the motor vehicle to a driver to support the driving at parking or the like. Furthermore, it relates to a picture displaying apparatus, a picture acquiring/warning apparatus and a motor vehicle position recognition/decision apparatus.

2) Description of the Related Art

So far, in such a type of picture composing apparatus, in the case of producing a wide-visual-field picture such as a panorama picture on the basis of a plurality of images by means of image composition, the plurality of images have been projected from the respective image pickup devices onto a common curved plane represented by a cylindrical surface and picked up by a virtual pickup device. This conventional procedure will be described hereinbelow with reference to FIGS. 14 to 15B.

FIG. 14 is an illustration of a composition procedure for a panorama picture 55 in which a scene 52 is taken through the use of two image pickup devices (not shown) mounted on a motor vehicle A to acquire images 53 and 54 which in turn, are projected onto a cylindrical surface 66. FIG. 15A three-dimensionally shows a procedure of projecting an image 62 taken by an image pickup device 61a and an image 63 taken by an image pickup device 61b for producing a composite picture on the cylindrical surface 66. A point 64 on the image 62 is projected to a point 67 and further projected to a point 69 on a composite picture plane 73 through a virtual image pickup means 72. In addition, a point 65 on the image 63 is projected to a point 68 on the cylindrical surface 66 and further projected to a point 70 on the composite picture plane 73 through the use of the same virtual image pickup means 72. FIG. 15B three-dimensionally shows a state projected onto a plane 71 perpendicular to an axis of the cylindrical surface 66. With the above-mentioned procedure, each point on the images 53 and 54 is map-converted to compose a picture such as the panorama picture shown in FIG. 14.

As an example of the above-described conventional technique, there has been known a technique disclosed in Japanese Unexamined Patent Publication (HEI) No. 5-14751. In addition, as examples of three-dimensional projection onto a plane, there have been known techniques disclosed in Japanese Unexamined Patent Publication (HEI) No. 6-20189 and in Japanese Unexamined Patent Publication No. 2000-134537. Still additionally, as an example of projection onto a spherical surface, there has been known a technique disclosed in Japanese Unexamined Patent Publication (HEI) No. 9-322040.

However, such conventional picture composing methods are designed to make one composite picture from a plurality of images taken by a plurality of image pickup devices mounted at positions different in projection center; therefore, discontinuous points 56a, 56b and 56c occur as shown in the composite panorama picture 55 of FIG. 14, which creates a problem in that difficulty is encountered in align the images at the joint between the different images. Moreover, in the case of the projection onto a cylinder, not only image distortions differ largely at positions near and apart from an image pickup device to make it difficult for a driver to seize a sense of distance, but also an image is largely distorted at a body end portion such as a bumper or fender of a motor vehicle as shown in a neighborhood image 57 on the panorama picture plane in FIG. 12, which makes it difficult to apply the methods to motor vehicle safety driving assist such as parking support.

SUMMARY OF THE INVENTION

The present invention has been developed with a view to eliminating the above-mentioned problems, and it is therefore an object of the invention to provide picture composing apparatus and method capable of offering information on an extremely wide range (wide visual field) by using a plurality of images taken from a plurality of different viewing points for easy seizing of positional relationship between a surrounding situation (or status) and a motor vehicle, and of joining the images together without a sense of incompatibility to compose a natural picture with high visibility, nice to look at.

For this purpose, in accordance with the present invention, there is provided a picture composing apparatus comprising a plurality of image pickup means, image pickup situation detecting means for detecting an image pickup situation of the image pickup means, first projecting means for projecting a plurality of images taken by the image pickup means onto a projection section while reflecting the image pickup situation detected by the image pickup situation detecting means to generate a plurality of first projected images, second projecting means for projecting the plurality of first projected images to a three-dimensional projection model to generate a second projected image, virtual image pickup means for virtually picking up the second projected image, three-dimensional projection model determining means for determining a position of the three-dimensional projection model and a shape thereof, and virtual image pickup means pickup situation determining means for determining an image pickup situation of the virtual image pickup means, with the second projected image being picked up by the virtual image pickup means in the image pickup situation determined by the virtual image pickup means pickup situation determining means to combine the plurality of images taken by the plurality of image pickup means.

According to this configuration, since the images taken by the image pickup means are projected to the first projection section and then projected to the three-dimensional projection model, it is possible to compose a picture whose joints do no stand out clearly.

In addition, in the picture composing apparatus according to the present invention, the plurality of image pickup means are mounted on a motor vehicle, and the picture composing apparatus further comprises motor vehicle running direction detecting means for detecting a running direction of the motor vehicle. Accordingly, the viewing point is set on a straight line passing through a projection center of a three-dimensional projection model projecting section in parallel with the running direction of the motor vehicle detected by the motor vehicle running direction detecting means, which can display a straight line satisfying a specific condition as a straight line even on a composite picture.

Still additionally, in the picture composing apparatus according to the present invention, the plurality of image pickup means are mounted on a motor vehicle, and the picture composing apparatus further comprises motor vehicle body position detecting means for detecting a body position of the motor vehicle. With this configuration, the viewing point of the virtual image pickup means is set on a plane passing through a plane projected image and a projection center of a three-dimensional projection model projecting section, which allows a straight line satisfying a specific condition to be displayed as a straight line even on a composite picture.

Yet additionally, in accordance with the present invention, there is provided a picture composing apparatus comprising a plurality of image pickup means, image pickup situation detecting means for detecting an image pickup situation of the image pickup means, first projecting means for projecting a plurality of images taken by the image pickup means onto a projection surface while reflecting the image pickup situation detected by the image pickup situation detecting means to generate a plurality of first projected images, second projecting means for projecting the plurality of first projected images to a spherical surface to generate a second projected image, and converting means for spreading the second projected image over a plane round one point on the spherical surface. With this configuration, even if the position of the spherical surface varies, it is possible to project a specific straight line as a straight line on a composite picture by adjusting the center point in spreading an image over a plane.

Moreover, in accordance with the present invention, there is provided a picture composing method comprising an image pickup step of picking up a plurality of images, an image pickup situation detecting step of detecting an image pickup situation in the image pickup step, a first projecting step of projecting a plurality of images picked up to a projection section while reflecting the image pickup situation detected to generate a plurality of first projected images, a second projecting step of projecting the plurality of first projected images to a three-dimensional projection model to generate a second projected image, a virtual image pickup step of virtually picking up the second projected image, a three-dimensional projection model determining step of determining a position of the three-dimensional projection model and a shape thereof, and an image pickup situation determining step of determining the image pickup situation in the virtual image pickup step, with the second projected image being picked up in the virtual image pickup step in the projection situation determined in the image pickup situation determining step to combine the plurality of images taken in the image pickup step.

With this arrangement, it is possible to compose a natural picture in which joints do not stand out at combining portions and which does not show a sense of incompatibility, and further to reduce the distortion of the composite picture through the use of a combination of, for example, a cylinder and a sphere as a three-dimensional projection model.

Still moreover, in accordance with the present invention, there is provided a picture composing method comprising an image pickup step of picking up a plurality of images, an image pickup situation detecting step of detecting an image pickup situation in the image pickup step, a first projecting step of projecting a plurality of images, picked up, to a projection section while reflecting the image pickup situation detected, to generate a plurality of first projected images, a second projecting step of projecting the plurality of first projected images to a spherical surface to generate a second projected image, a plane spreading step of spreading the second projected image over a plane round one point on the spherical surface, and a spherical surface position determining step of determining a position of the spherical surface, with a plurality of images obtained in the plane spreading step are combined to produce a composite picture.

With this configuration, a straight line satisfying a specific condition can be shown as a crisp and continuous straight line even on a composite picture, and the composite picture is recognizable as a natural picture which does not show a sense of incompatibility.

Furthermore, in accordance with the present invention, there is provided a picture displaying apparatus comprising a plurality of image pickup means, image pickup situation detecting means for detecting an image pickup situation of the image pickup means, first projecting means for projecting a plurality of images taken by the image pickup means onto a projection section while reflecting the image pickup situation detected by the image pickup situation detecting means to generate a plurality of first projected images, second projecting means for projecting the plurality of first projected images to a three-dimensional projection model to generate a second projected image, virtual image pickup means for virtually picking up the second projected image, three-dimensional projection model determining means for determining a position of the three-dimensional projection model and a shape thereof, virtual image pickup means pickup situation determining means for determining an image pickup situation of the virtual image pickup means, display means for displaying an image, and display data conversion control means for converting an image to be displayed into data adaptable to the display means, with the second projected image being picked up by the virtual image pickup means in the image pickup situation determined by the virtual image pickup means pickup situation determining means to combine the plurality of images taken by the plurality of image pickup means to produce a composite picture and the composite picture being converted by the display data conversion control means to be adaptable to the display means.

According to this configuration, it is possible to display the images taken by image pickup means, projected images or a composite picture on the display means, thus making it possible for a driver to easily seize the surrounding situation and the positional relationship with respect to the motor vehicle.

Still furthermore, in accordance with the present invention, there is provided a picture acquiring/warning apparatus comprising a plurality of image pickup means, image pickup situation detecting means for detecting an image pickup situation of the image pickup means, first projecting means for projecting a plurality of images taken by the image pickup means onto a projection section while reflecting the image pickup situation detected by the image pickup situation detecting means to generate a plurality of first projected images, second projecting means for projecting the plurality of first projected images to a three-dimensional projection model to generate a second projected image, virtual image pickup means for virtually picking up the second projected image, three-dimensional projection model determining means for determining a position of the three-dimensional projection model and a shape thereof, virtual image pickup means pickup situation determining means for determining an image pickup situation of the virtual image pickup means, detecting means for detecting an approaching situation of an object, and warning means for issuing warning information when the object approaching situation detected by the detecting means reaches an arbitrarily set object approaching situation.

With this configuration, in a case in which a coupling object is coupled to a rear portion of a body of a motor vehicle, warning information can be issued in accordance with the coupling object approaching state, thereby giving warning to an operator. In addition, at the completion of the coupling, the coupled condition is confirmable.

Yet furthermore, in accordance with the present invention, there is provided a motor vehicle position recognition/decision apparatus comprising a plurality of image pickup means mounted on a motor vehicle, image pickup situation detecting means for detecting an image pickup situation of the image pickup means, first projecting means for projecting a plurality of images taken by the image pickup means onto a projection section while reflecting the image pickup situation detected by the image pickup situation detecting means to generate a plurality of first projected images, second projecting means for projecting the plurality of first projected images to a three-dimensional projection model to generate a second projected image, virtual image pickup means for virtually picking up the second projected image, three-dimensional projection model determining means for determining a position of the three-dimensional projection model and a shape thereof, virtual image pickup means pickup situation determining means for determining an image pickup situation of the virtual image pickup means, image detecting means for, when at least one of the plurality of image pickup means is backward image pickup means placed on a rear side of the motor vehicle, detecting an image of an arbitrary object from images taken by the backward image pickup means, images obtained by projecting the taken images to the three-dimensional projection model or a composite picture obtained by combining the taken images in the virtual image pickup means, recognizing means for recognizing a positional relationship between the image detected by the image detecting means and an image of the motor vehicle, and decision means for making a decision on a positional difference between said motor vehicle and said object on the basis of the positional relationship recognized by said recognizing means.

With this configuration, images taken by the image pickup means, projected images or a composite image can be put on display means, which allows an operator (driver) to seize the surrounding situation, particularly, a position of an object (including object display) from an image of an object set arbitrarily and the positional relationship with respect to a motor vehicle.

BRIEF DESCRIPTION OF THE DRAWINGS

Other objects and features of the present invention will become more readily apparent from the following detailed description of the preferred embodiments taken in conjunction with the accompanying drawings in which:

FIG. 5 is a block diagram showing a configuration of a picture composing apparatus according to a second embodiment of the present invention;

DESCRIPTION OF THE PREFERRED EMBODIMENTS

Embodiments of the present invention will be described hereinbelow with the drawings. In the description of the embodiments of the present invention, although images taken through the use of two image pickup means are combined into one composite picture, even if three or more image pickup means are put to use, as a mater of course, through the repetition of the same procedure, it is possible to compose one composite picture from images taken by many image pickup means.

First Embodiment

Figure 1:
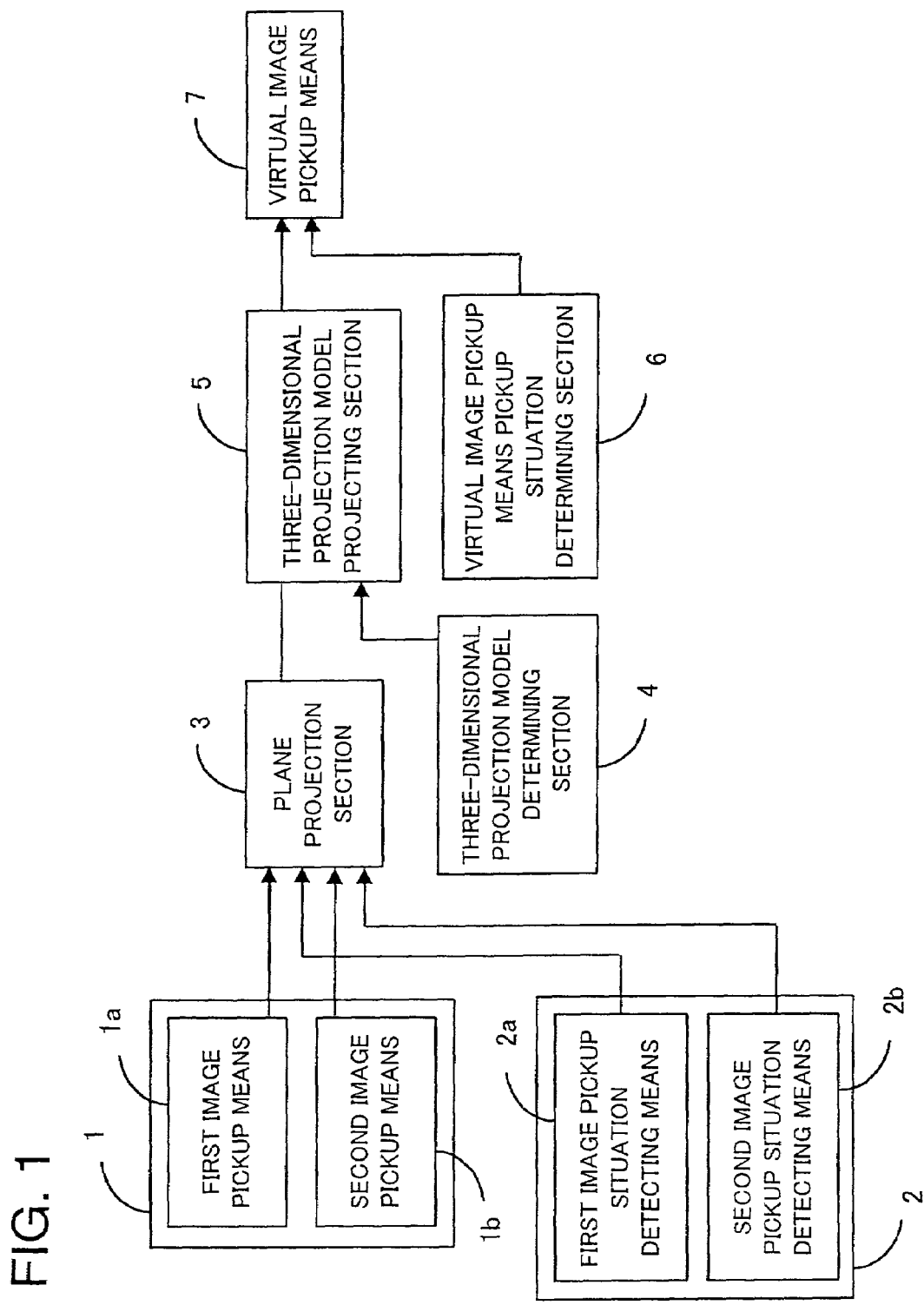
FIG. 1 is a block diagram showing a configuration of a picture composing apparatus according to a first embodiment of the present invention.

FIG. 1 is a block diagram showing a configuration of a picture composing apparatus according to a first embodiment of the present invention. As FIG. 1 shows, this picture composing apparatus is made up of image pickup means 1, image pickup situation detecting means 2, a plane projection section 3, a three-dimensional projection model determining section 4, a three-dimensional projection model projecting section 5, a virtual image pickup means pickup situation determining section 6 and virtual image pickup means 7.

The image pickup means 1 comprises two image pickup devices of a first image pickup means 1a and a second image pickup means 1b. The image pickup situation detecting means 2 comprises a first image pickup situation means 2a for detecting an image pickup situation of the first image pickup means 1*a* and a second image pickup situation detecting means 2*b* for detecting an image pickup situation of the second image pickup means 1*b*, the plane projection section 3 receives the outputs of the first image pickup means 1*a*, the second image pickup means 1*b*, the first image pickup situation detecting means 2*a* and the second image pickup situation detecting means 2*b*. The output of the plane projection section 3 and the output of the three-dimensional projection model determining section 4 are inputted to the three-dimensional projection model projecting section 5. In addition, the output of the three-dimensional projection model projecting section 5 and the output of the virtual image pickup means pickup situation determining section 6 are inputted to the virtual image pickup means 7.

In this case, a projection section to be used in the plane projection section 3 is set as a plane on which a motor vehicle is placed, that is, a road surface. Although, to be exact, the road surface is not a complete plane, it can be considered that the road surface has a substantial plane. In addition, a three-dimensional projection model to be used in the three-dimensional projection model projecting section 5 is set as a curved surface forming a smooth combination of a cylindrical surface, perpendicular to the road surface, and a spherical surface, with the projection center being set as a point on the axis of the cylindrical surface.

First, the image pickup means pickup situation detecting section 2 associates a plurality of points on a road surface, whose positions are findable or identifiable, with a plurality of points on an image taken by the first image pickup means 1*a* or the second image pickup means 1*b*, thereby detecting an image pickup situation of the image pickup means 1*a* or 1*b*. The image pickup situation signifies, for example, the following parameters, or the like:

(1) a mounted place of the image pickup means with respect to a road surface;

(2) a direction in which the image pickup means is located with respect to the road surface; and (3) values representative of various image pickup characteristics such as field angle, focal length and lens strain.

If these parameters are detected, for an object already known in shape and position relative to the image pickup means, it is possible to obtain, through logical numerical calculations, a state of the object on an image taken by the image pickup means. In fact, in order to previously collect necessary parameters and resister them in a memory or the like, a grating-like object is taken at the adjustment stage before shipment from a factory to put coordinates in a three-dimensional space and numeric values of projected plane image coordinates in a computer for obtaining estimated values of parameters, alternatively, positions and angles representative of a mounting state of the image pickup means are detected by sensors to put these data in a computer for mechanically (automatically) obtaining parameters.

Furthermore, in addition to the aforesaid methods of obtaining parameters, the image pickup means pickup situation detecting section 2 can also detect an image pickup situation of each of the image pickup means by obtaining a transformation matrix from an image to a road surface. This transformation matrix can be obtained by associating each of a plurality of points on the road surface, already found in position, with each of a plurality of points on an image. This transformation matrix enables plane projection from an image to a road surface.

Figure 2:
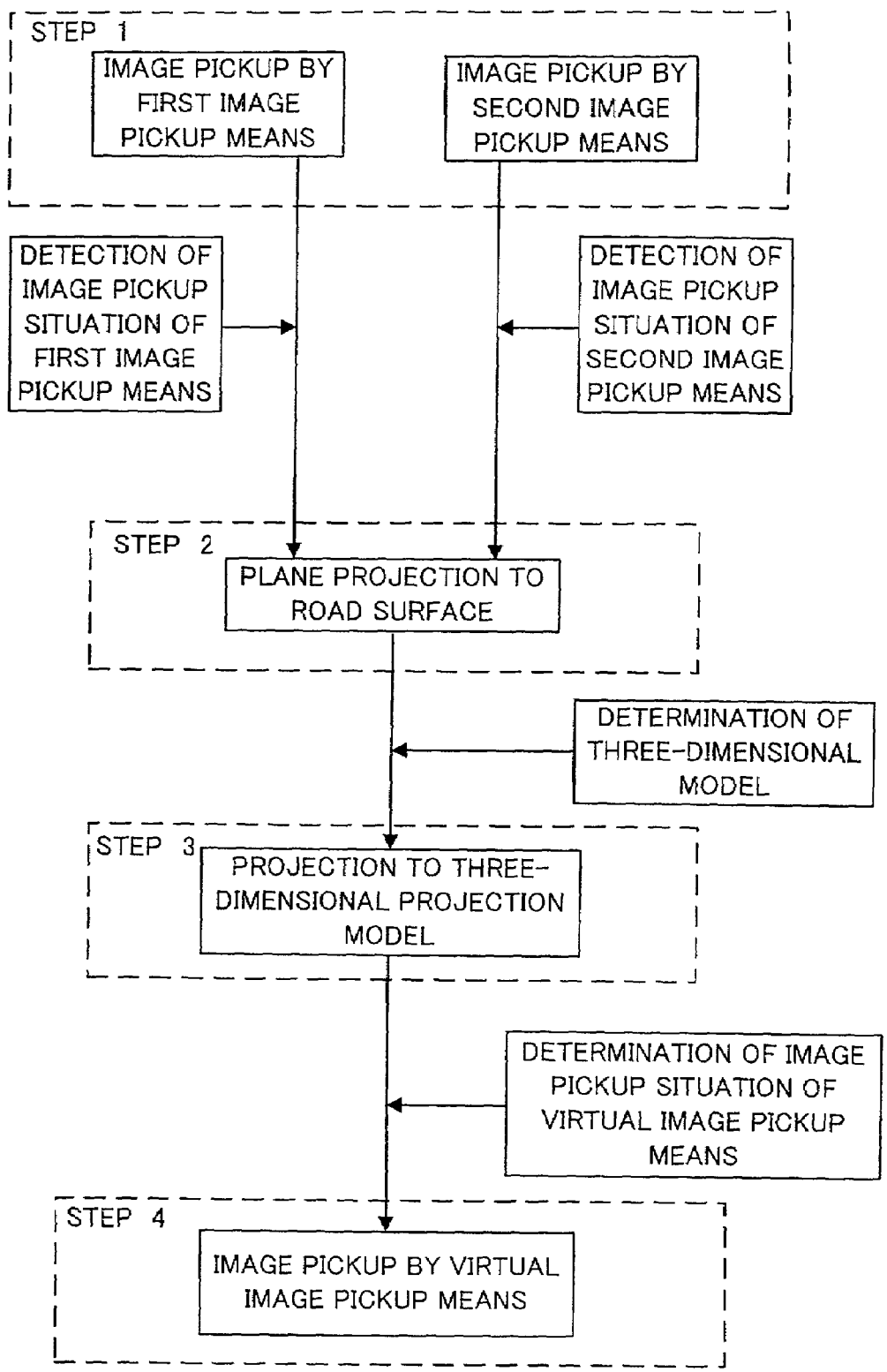
FIG. 2 is an illustration useful for explaining a flow of processing according to the first embodiment of the present invention.
Figure 3A:
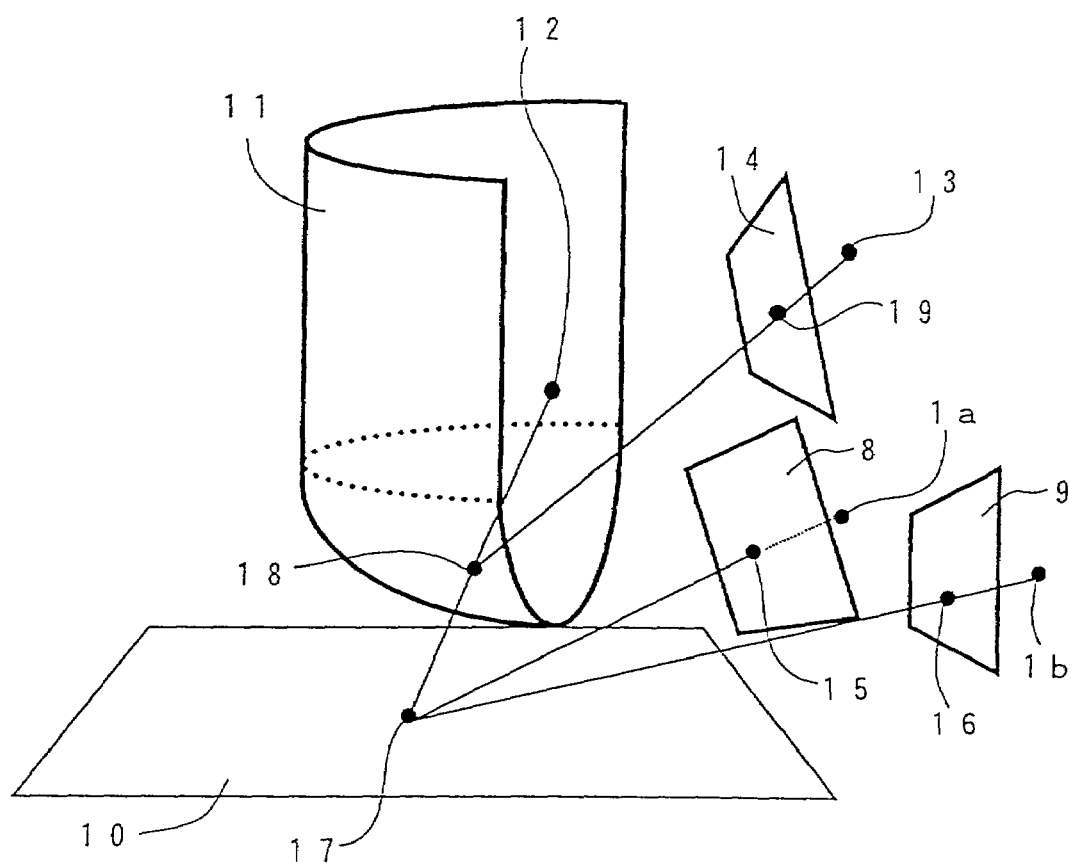
FIGS. 3A and 3B are illustrations of the principle of a projection process to be conducted until a composite picture reaches completion.

Secondly, referring to FIGS. 2 and 3A, a description will be given hereinbelow of processing in each of the projection sections. FIG. 2 is a flow chart showing a flow of processing in the picture composing apparatus according to the first embodiment of the present invention, and FIG. 3A is an illustration useful for explaining the principle of a process for forming a composite picture by projecting images taken by the image pickup means 1*a* and 1*b*.

In FIG. 2, a flow up to a STEP 2 signifies a process in which the plane projection section 3 projects each of images taken by the image pickup means 1*a* and 1*b* in a STEP 1 to a projection section (road surface) in accordance with each of the image pickup situations acquired by the image pickup means pickup situation detecting section 2. As three-dimensionally shown in FIG. 3A, the projection corresponds to the conversion of a point 15 on an image 8 taken by the image pickup means 1*a* and a point 16 on an image 9 taken by the image pickup means 1*b* into a point 17. At this stage, the conversion is made so that the images of the same object on a road surface taken and incorporated into the image 8 and the image 9, respectively, exactly lie one upon another. That is, for example, a white line on a road surface is displayed exactly without projected doubly. This plane projection section 3 converts the coordinates of the point 15 on the image 8 and the point 16 on the image 9 into the coordinates of the point 17 on the road surface.

In addition, in FIG. 2, a flow up to a STEP 3 signifies a process in which the three-dimensional projection model projecting section 5 projects an image projected onto the road surface by the plane projection section 3 to a three-dimensional projection model 11. The projection to the three-dimensional projection model 11 signifies that the point 17 on the road surface is projected to an intersection point 18 of a straight line connecting the point 17 with a projection center 12 of the three-dimensional projection model and a surface of the three-dimensional projection model 11.

Still additionally, in FIG. 2, a flow up to a STEP 4 means a process in which the virtual image pickup means 7 picks up an image drawn on the three-dimensional projection model 11 in the three-dimensional projection model projecting section 5 in accordance with an image pickup situation determined by the virtual image pickup means pickup situation determining section 6. As shown three-dimensionally in FIG. 3A, this image pickup corresponds to the conversion into an intersection point 19 of a straight line connecting the point 18 with a viewing point 13 of the virtual image pickup means 7 and a picture composing surface 14. An image obtained by the virtual image pickup means 7 becomes a composite picture.

Figure 3B:
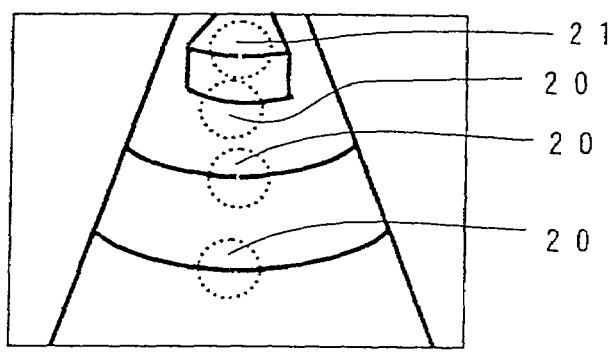
Figure 14:
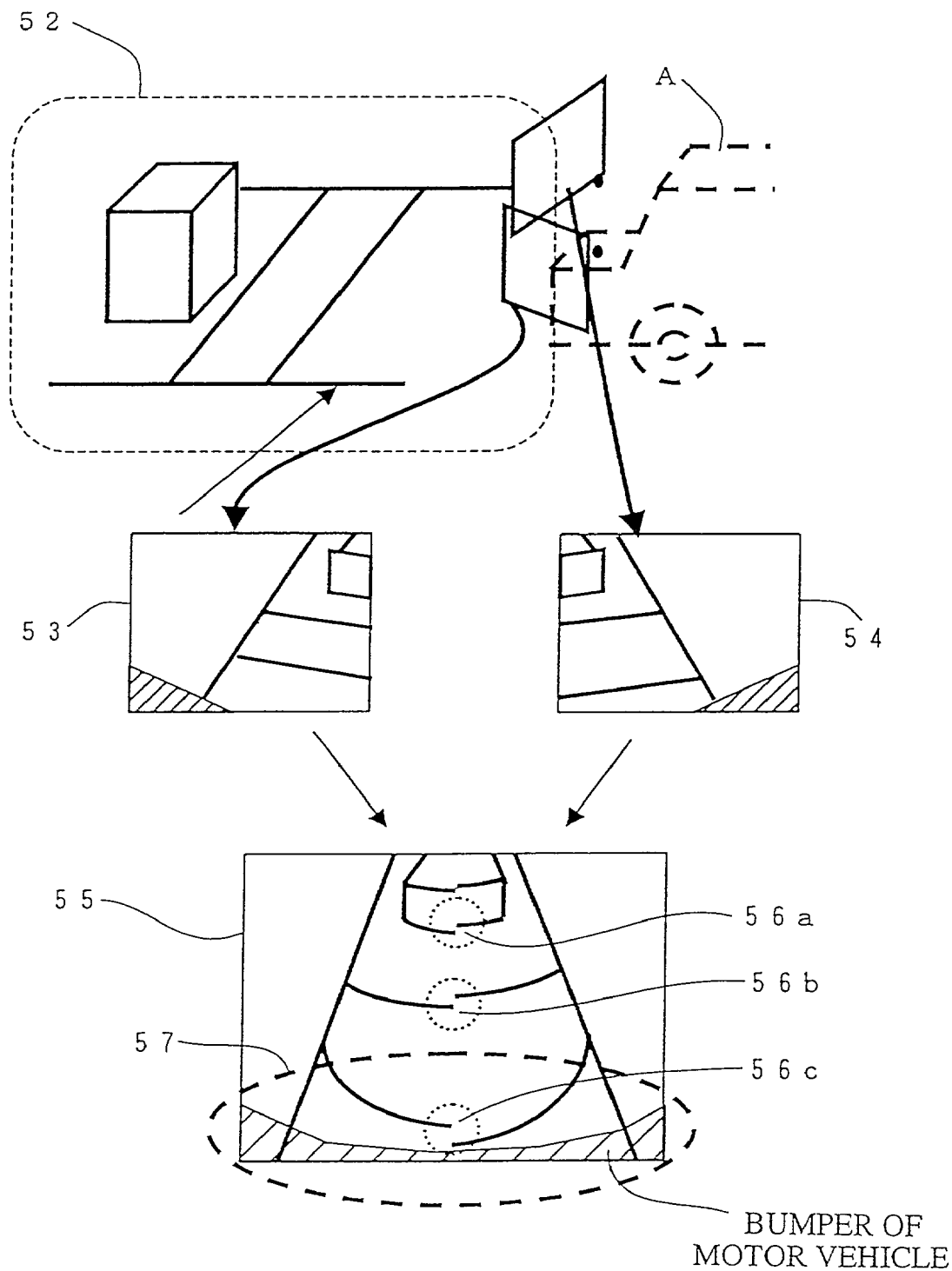
FIG. 14 is an illustration of a procedure of composing a panorama picture according to a conventional picture composing method.
Figure 15A:
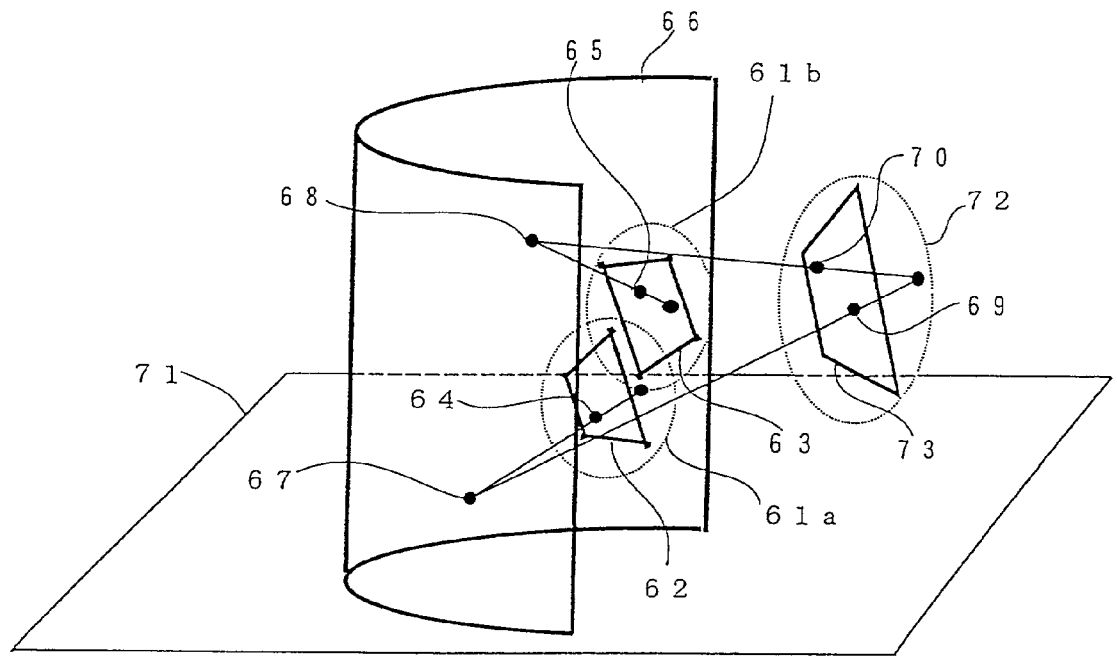
FIGS. 15A and 15B show three-dimensionally a procedure of composing a panorama picture according to the conventional picture composing method.
Figure 15B:
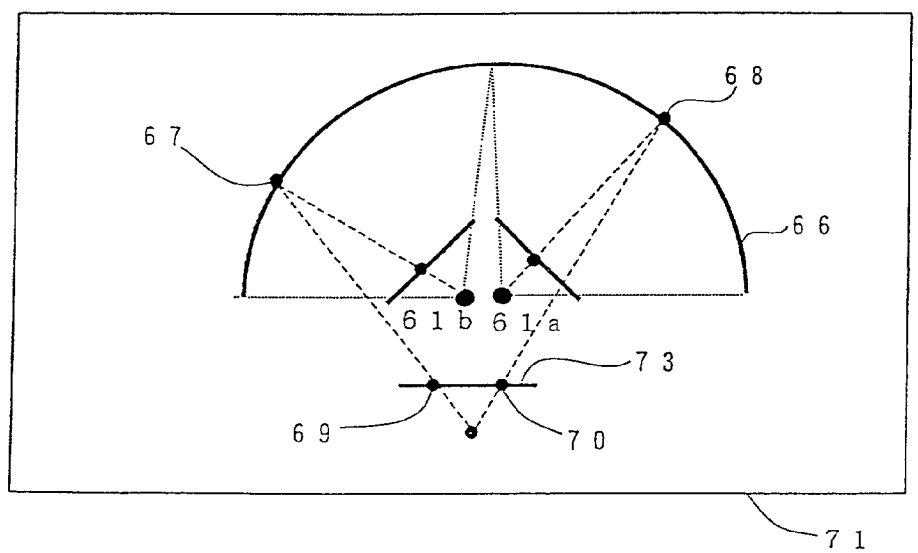

When the images obtained in the condition shown in the image 52 of FIG. 14 is combined in this way, a panorama picture is obtainable as shown in FIG. 3B. The straight lines and others on the road surface are smoothly joined to each other as shown at joint portions 20. In addition, even a joining portion of a three-dimensional object sufficiently separated from the image pickup means does not stand out as shown in a joint portion 21.

Figure 4A:
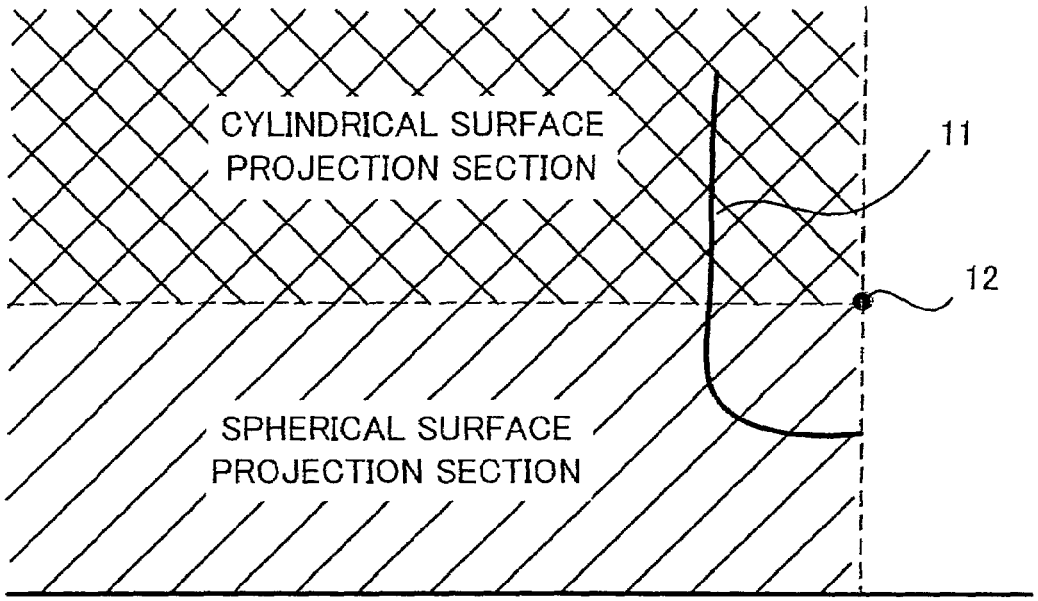
FIGS. 4A and 4B are illustrations useful for explaining the fact that an area to be projected to a cylindrical surface and an area to be projected to a spherical surface vary with variation of a position of a three-dimensional projection model forming a combination of a cylindrical surface and a spherical surface, in the first embodiment of the present invention.
Figure 4B:
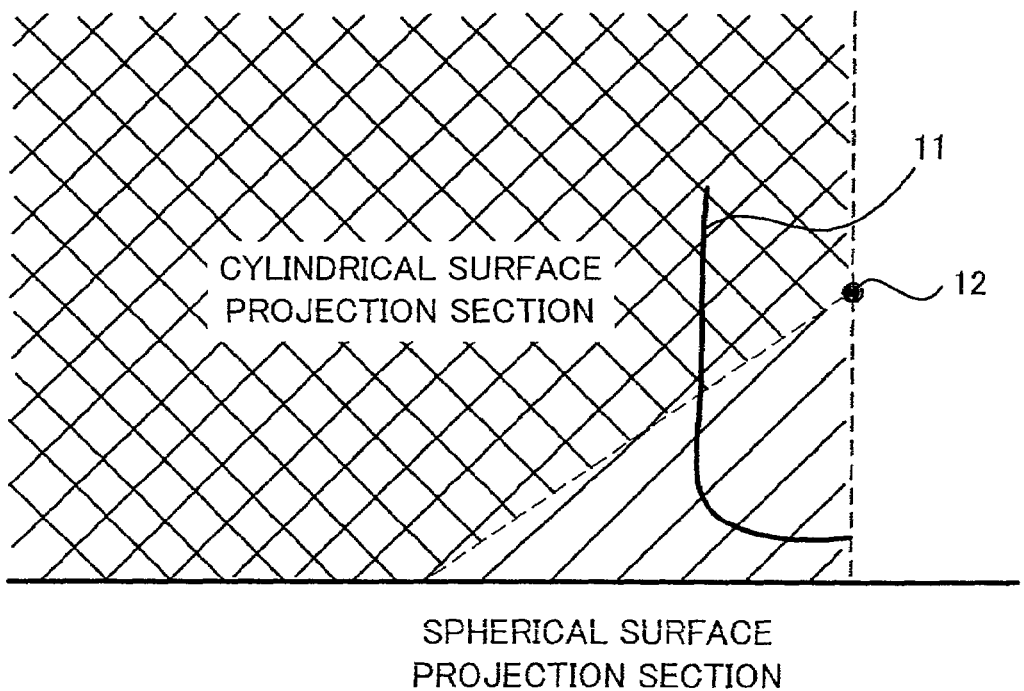

Furthermore, when the position of the three-dimensional projection model 11 or the projection center 12 is shifted in a direction perpendicular to the road surface, it is possible to change the ranges of an area to be projected onto a cylindrical surface and an area to be projected onto a spherical surface. For example, as FIG. 4A shows, when the boundary between the cylindrical surface and spherical surface of the three-dimensional projection model 11 and the projection center 12 are set to be equal in height to each other, an image existing at a position lower than the projection center 12 is projected onto a spherical surface, while the other image is projected onto the cylindrical surface. In addition, as FIG.

4B shows, when the position of the three-dimensional projection model 11 is set at a position lower than the position shown in FIG. 4A in a state where the projection center 12 stays intact, the area to be projected onto the spherical surface covers only the vicinity of the projection center 12, whereas the area to be projected onto the cylindrical surface enlarges. In this way, it is possible to produce a composite picture adaptable to the application a driver intends.

As described above, according to the first embodiment of the present invention, since the projection section is set at a road surface, even in the case of the composition of images taken by a plurality of image pickup means different in position from each other, images on a white line or the like on the road surface are completely aligned with each other at joints among different images, so the situation of the road surface is understandable to a driver. In this case, in general, although a three-dimensional object other than an object on a plane of the road surface does not satisfy the alignment at the joints among different images, a three-dimensional object existing at a sufficiently remote position with respect to a distance between the positions of the different image pickup means substantially satisfies the alignment at the joints among different images. Accordingly, the composed image becomes a natural picture which does not show a sense of incompatibility.

In addition, the image pickup situation detecting means previously detects at least any one of a position, posture and image pickup characteristic of the image pickup means with respect to the projection section, thereby achieving easy agreement of an image taken by the image pickup means with the plane projection to the road surface.

Still additionally, the plane projection section projects points on an image, picked up, to the projection section through the use of the transformation matrix obtained from combinations of corresponding points on the image picked up and the projection section, thus enabling the projection from the image taken by the image pickup means to the road surface.

Moreover, since a plurality of surfaces different in shape from each other are combined to form a three-dimensional projection model, the projection can be made to a model as close to an object to be projected as possible.

Still moreover, since the plurality of surfaces different in shape are combined so that the joints therebetween do not stand out, it is possible to prevent a straight line or the like on a road surface from being composed in a state bent on a composite picture, thereby offering a natural picture which does not show a sense of incompatibility as a whole.

Furthermore, a three-dimensional projection model comprises a combination of a sphere and a cylinder and when the projection is made to the three-dimensional projection model, a distant place is projected to the cylinder while the other place is projected to the sphere, that is, a place near a motor vehicle is projected to the sphere while a place apart therefrom is projected to the cylinder; therefore, as compared with the projection to only the cylinder, the image distortion at the nearby place is reducible and a sense of distance is easily seizable. In this case, if the center of the spherical surface is placed on the axis of the cylindrical surface, and the spherical surface and the cylindrical surface are set to be equal in radius to each other, then the boundary between the spherical surface and the cylindrical surface becomes smooth. In addition, as compared with a case in which a plane and cylinder are combined and connected smoothly at the boundary portion therebetween, the distortion at the nearby place becomes more reducible, thus composing a picture with very less sense of incompatibility.

In the above description, although the three-dimensional projection model has been constructed with a combination of a cylinder and a sphere, it is also acceptable to use only the sphere. In this case, at the composition of a wide-visual-field picture, it is possible to provide a picture free from great distortion as a whole. A picture like an image taken through the use of a fisheye lens becomes producible in a manner that a sphere is used as a three-dimensional projection model, and although uniform distortion occurs in the whole picture, a driver can easily recognize the type of a neighboring object.

In addition, even if a cylinder and an elliptical sphere are combined so that the joint therebetween becomes smooth and a distant place is projected to the cylinder while the other place is projected to the elliptical sphere, the effects similar to those of the combination of a cylinder and a sphere are obtainable.

Still additionally, it is also possible that a plane and a cylinder are combined into a three-dimensional projection model and, in the projection to this three-dimensional projection model, a distant place is projected to the cylinder while the other place is projected to the plane. In this case, since a place near a motor vehicle is projected to the plane, a straight line such as a white line on a road surface can be projected as a straight line even on the composite picture. Moreover, since a distant place is projected to the cylindrical surface, the image are preventable from great distortion. Accordingly, a car can easily be parked along white lines at a parking zone or the like, and the surrounding situation becomes seizable over a wide range. Moreover, in a case in which a cylindrical surface is singly used as a three-dimensional projection model, an area near the image pickup means becomes larger on the composite picture, resulting in making it difficult to seize the sense of distance. However, it is possible to solve this problem by projecting the neighboring area to a plane.

Furthermore, it is also appropriate to use, as a three-dimensional projection model, a combination of a cylinder, a plane and a curved surface smoothly forming a boundary therebetween. Thus, in a case in which images obtained by picking up distant scenes are combined with each other, it can be considered that the distant scenes are images drawn on a cylinder standing vertically. On the other hand, a problem that an extremely distorted image appears in a case in which an object existing just under the image pickup means is projected to a cylindrical surface is eliminable in a manner that a distant place is projected to a cylinder, an intermediate place is projected to a curved surface smoothly forming the boundary between the cylinder and a plane and the other place is projected to the plane.

Accordingly, assuming a case in which a load carrier is coupled to a motor vehicle through the use of a hitch mounted on the motor vehicle, in the initial state where the load carrier is at a position separated from the motor vehicle, that is, when his/her own motor vehicle is brought close to the load carrier, the load carrier is just projected onto the aforesaid cylindrical projection surface and displayed, so it is possible to easily seize the surrounding situation and the relationship with objects, and to accurately understand the positional relationship on the hitch through the aforesaid plane projection section or spherical surface projection section immediately before coupling of the load carrier, which allows easy coupling between the load carrier and the motor vehicle.

Still furthermore, naturally, at the parking in a limited parking space, or in showing the positional relationship with respect to rear motor vehicles on a plurality of traffic lanes, it is possible to offer a picture readily understandable to a driver.

Second Embodiment

FIG. 5 is a block diagram showing a configuration of a picture composing apparatus according to a second embodiment of the present invention. In FIG. 5, the same functional sections as those shown in FIG. 1 are marked with the same reference numerals, and the detailed description thereof will be omitted for brevity. This picture composing apparatus, in addition to the configuration of the picture composing apparatus shown in FIG. 1, comprises a motor vehicle running direction detecting section 22 for detecting a running direction of a motor vehicle and further for inputting the detection result to the virtual image pickup means pickup situation determining section 6.

As in the case of the first embodiment, also in the second embodiment, a projection surface to be used in the plane projection section 3 is set as a road surface, and a three-dimensional projection model to be used in the three-dimensional projection model projecting section 5 is set as a curved surface based on smooth connection between a cylindrical surface perpendicular to the road surface and spherical surface, with the projection center being set at a point on the axis of the cylinder.

Figure 6A:
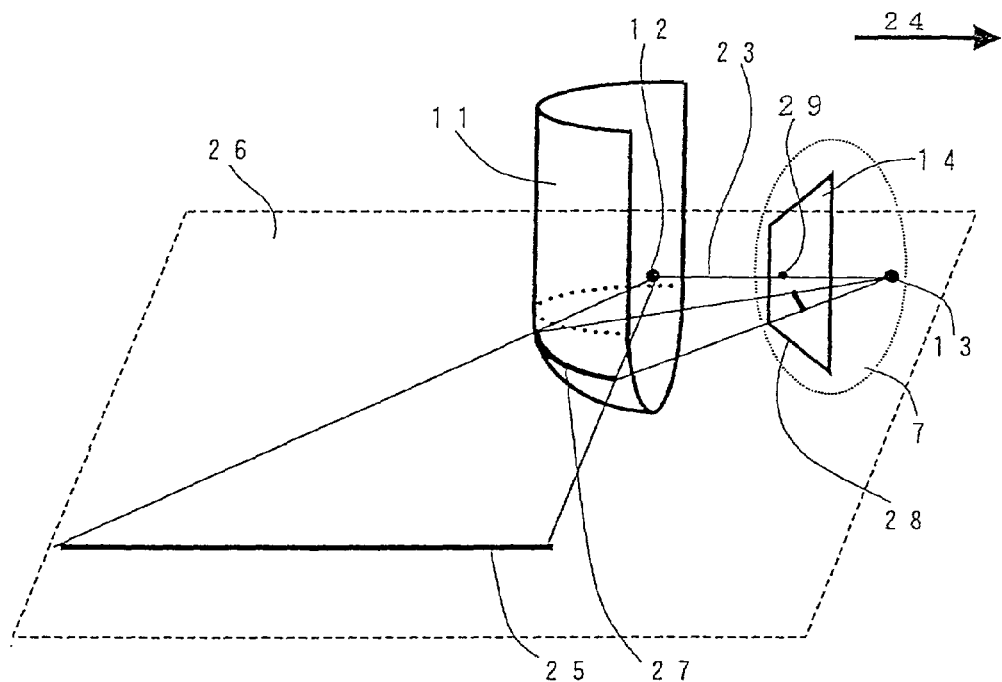
FIGS. 6A and 6B are illustrations useful for explaining a position of a viewing point of a virtual image pickup means and variation of an image in the second embodiment of the present invention.

FIG. 6A shows three-dimensionally a case in which the virtual image pickup means produces a composite picture when a motor vehicle is running straight. In FIG. 6A, omitted is the process (process up to STEP 2 in FIG. 2) in which the plane projection section 3 projects each of the images taken by the image pickup means 1a and 1b to the road surface in accordance with an image pickup situation.

In the second embodiment of the present invention, at the image pickup by the virtual image pickup means 7, the position of the viewing point 13 of the virtual image pickup means 7 is set on a straight line passing through the projection center 12 of the three-dimensional projection model projecting section 5 in parallel with the running direction of the motor vehicle detected by the motor vehicle running direction detecting section 22. At this time, straight lines parallel to the running direction of the motor vehicle become straight lines even on a composite picture, and the straight lines on the composite picture intersect each other at one point, and when the motor vehicle is running straight, since stationary objects existing around the motor vehicle relatively conducts straight movement in parallel with the running direction of the motor vehicle when viewed from the motor vehicle, these objects also conduct straight movement even on the composite picture.

The principle thereof will be described hereinbelow using the geometrical relationship between the virtual image pickup means 7 and the three-dimensional projection model 11 in FIG. 6A. A line segment 23 connecting the projection center 12 of the three-dimensional projection model 11 to the viewing point 13 of the virtual image pickup means 7 is parallel with the motor vehicle running direction 24. At this time, a line 25 parallel with the running direction of the motor vehicle, drawn on the road surface, and the line segment 23 exist on the same plane 26. An image 27 produced by projecting the aforesaid parallel line 25 to the three-dimensional projection model 11 forms an intersection line between the three-dimensional projection model 11 and the plane 26, and an image 28 produced for when the virtual image pickup means 7 picks up the image 27 exists on an intersection line between the picture composing surface 14 and the plane 26. The image 28 is a straight line because of being an intersection line between a plane and a plane, and the straight line passes through an intersection point 29 between the line segment 23 and the picture composing surface 14.

The above description is not limited to the road surface, but it is also valid for arbitrary straight lines existing on the plane the line segment 23 exists on, and all the extensions of these images meet at a point 29.

Figure 6B:
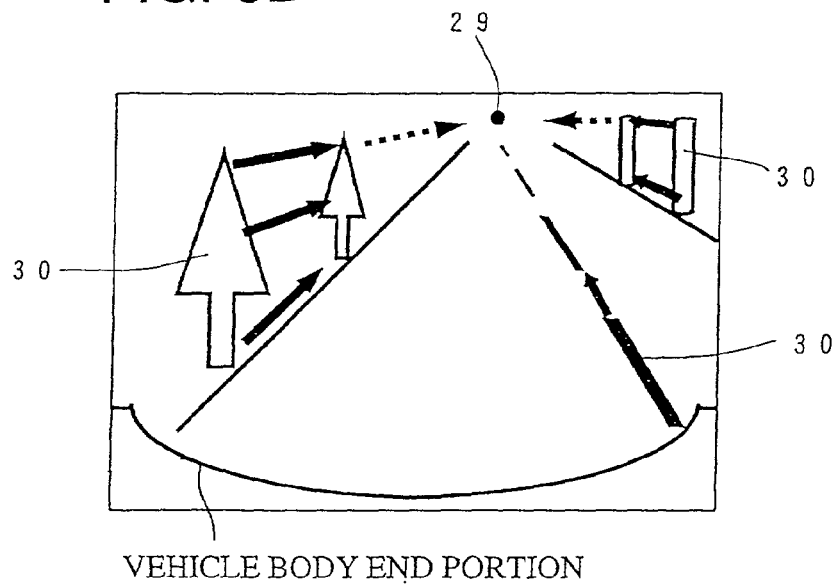

When the motor vehicle is running straight, a stationary object existing around the motor vehicle moves relatively on a straight line parallel with the line segment 23 when viewed from the motor vehicle. Accordingly, as shown in a panorama picture of FIG. 6B, an image 30 of the stationary object conducts straight movement toward one point 29.

Thus, according to the second embodiment of the present invention, the plurality of image pickup means are mounted on a motor vehicle and the motor vehicle running direction detecting means is further mounted thereon, and the position of the viewing point of the virtual image pickup means is set on a straight line passing through the projection center of the three-dimensional projection model projecting section in parallel with the running direction of the motor vehicle; therefore, as a feature, a straight line parallel with the running direction of the motor vehicle is projected as a straight line even on a composite picture. Accordingly, when the motor vehicle conducts straight movement, an stationary object around the motor vehicle relatively conducts straight movement in parallel with the running direction of the motor vehicle when viewed from the motor vehicle, and the stationary object moves on a straight line on a composite picture, thus providing an image understandable in situation to the driver.

Third Embodiment

Figure 7:
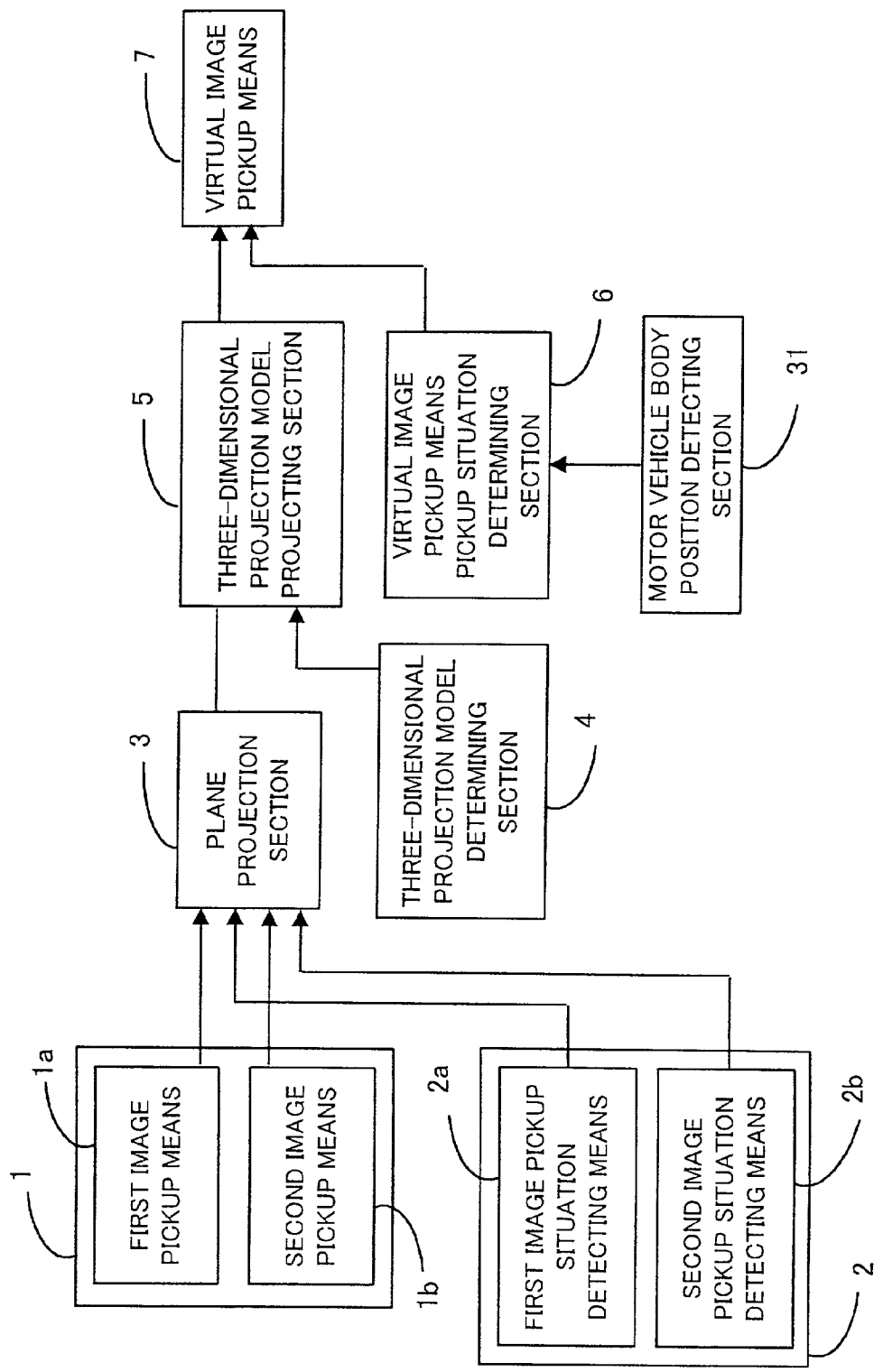
FIG. 7 is a block diagram showing a configuration of a picture composing apparatus according to a third embodiment of the present invention.

FIG. 7 is a block diagram showing a configuration of a picture composing apparatus according to a third embodiment of the present invention. Also in FIG. 7, the same functional sections as those shown in FIG. 1 are marked with the same reference numerals, and the detailed description thereof will be omitted for brevity. This picture composing apparatus comprises, in addition to the configuration shown in FIG. 1, a motor vehicle body position detecting section 31 for detecting a position of a body of a motor vehicle to input the detection result to the virtual image pickup means pickup situation detecting section 6.

As in the case of the first embodiment, also in the third embodiment, a projection surface to be used in the plane projection section 3 is set as a road surface, and a three-dimensional model to be used in the three-dimensional projection model projecting section 5 is set as a curved surface based on smooth connection therebetween a cylindrical surface perpendicular to the road surface and a spherical surface, with the projection center being set on the axis of the cylinder.

Figure 8A:
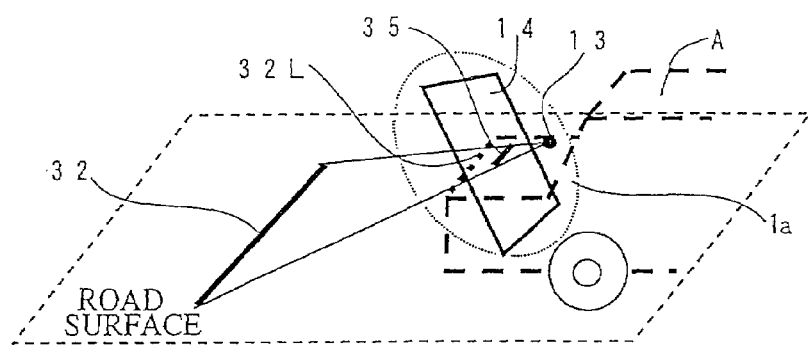
FIGS. 8A to 8D are illustrations useful for explaining a position of a viewing point of a virtual image pickup means at which a body end portion shows a straight line on a composite picture in the third embodiment of the present invention.
Figure 8B:
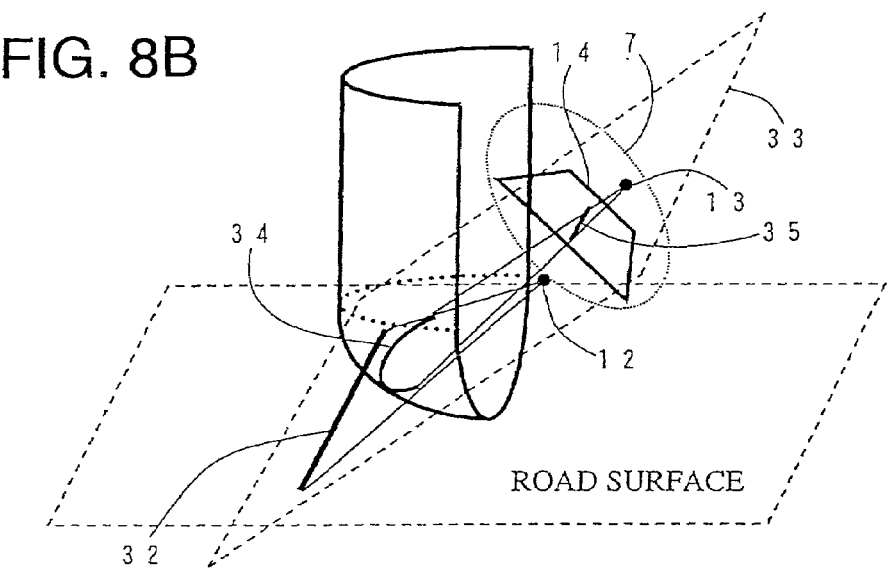

FIG. 8A schematically shows a process in the third embodiment of the invention for obtaining a projection vehicle body end portion 32 in a manner that a vehicle body end portion 32L of a motor vehicle A picked up by the first image pickup means 1a is projected onto a road surface through the use of a vehicle body position detected by the motor vehicle body position detecting section 31 mounted on the motor vehicle A. FIG. 8B three-dimensionally shows an arrangement in the third embodiment of the invention for when the projection vehicle body end portion 32 obtained by projecting the vehicle body end portion 32L onto the road surface through the use of the vehicle body position detected by the motor vehicle body position detecting section 31 mounted on the motor vehicle A is formed as a composite picture by means of the virtual image pickup means 7. As well as FIG. 6A, in FIG. 8B, omitted is the process up to STEP 2 in FIG. 2, that is, the process in which the plane projection section 3 projects each of images taken by the image pickup means 1a and 1b onto a road surface in accordance with each of image pickup situations.

Figure 8C:
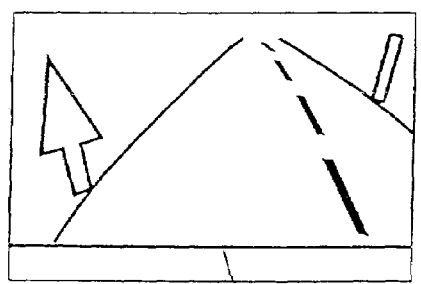
Figure 8D:
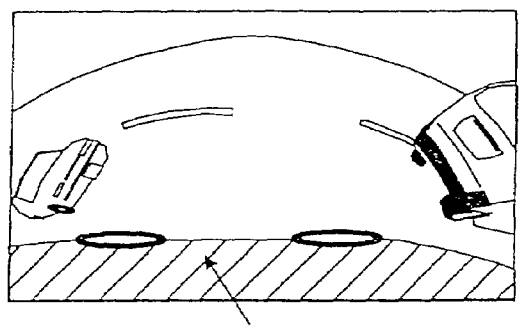

A position of the viewing point 13 of the virtual image pickup means 7 is determined in accordance with the following procedure. In this case, assuming that the vehicle body end portion 32L of the motor vehicle A shows a straight line configuration, the image 32 obtained by the plane projection of the vehicle body end portion 32L also has a straight line configuration. The viewing point 13 of the virtual image pickup means 7 is set on a plane 33 including the image 32 and the projection center 12. At this time, an image 34 obtained by projecting the image 32 to the three-dimensional projection model also exists on the plane 33, and an image 35 on a composite picture based on the image 34 also lies on the plane 33. Thus, the image 35 exists on an intersection line between the plane 33 and the picture composing surface 14, and has a straight line configuration. Accordingly, as shown in a panorama picture of FIG. 8C, on the composite picture, a vehicle body end portion 36 becomes a straight line without bent or made intermittent. In addition, as FIG. 8D shows, it is also possible that a side surface of his/her own motor vehicle is converted into a straight line to compose a picture suitable for use in monitoring the lateral situation of the motor vehicle. Still additionally, it is also possible to compose a picture in which a lane adjacent to a lane his/her own motor vehicle is running in, or an intersecting central line of a road at a crossing, shows a straight line configuration.

As described above, according to the third embodiment of the present invention, a plurality of image pickup means are mounted on a motor vehicle, and a motor vehicle body position detecting means is provided for detecting a body position of the motor vehicle, while the position of the viewing point of the virtual image pickup means is set on a plane including an image obtained by plane-projecting an end portion of the body of the motor vehicle and the projection center of the second projection means; therefore, even on the composite picture, the body end portion of the motor vehicle is projected as a straight line.

Fourth Embodiment

Figure 9:
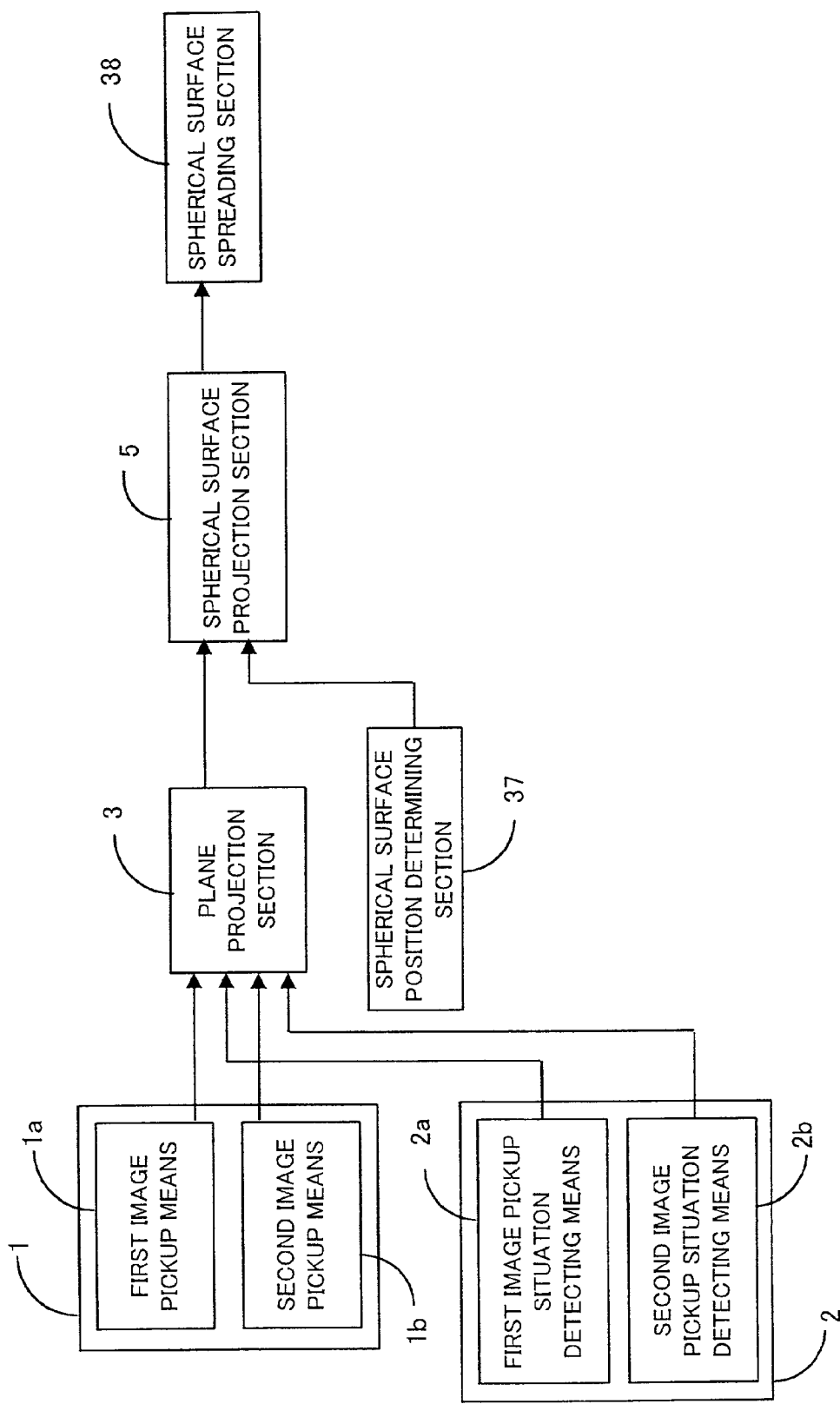
FIG. 9 is a block diagram showing a configuration of a picture composing apparatus according to a fourth embodiment of the present invention.

FIG. 9 is a block diagram showing a configuration of a picture composing apparatus according to a fourth embodiment of the present invention.

Also in FIG. 9, the same functional sections as those in FIG. 1 are marked with the same reference numerals, and the detailed description thereof will be omitted for simplicity.

As FIG. 9 shows, this picture composing apparatus employs a spherical surface as a three-dimensional projection model to be used in the three-dimensional projection model projecting section 5 and further comprises a spherical surface position determining section 37 for determining the position of the spherical surface. In addition, for composing a picture, a spherical surface spreading section 38 is used in place of the virtual image pickup means shown in FIG. 1.

Figure 10A:
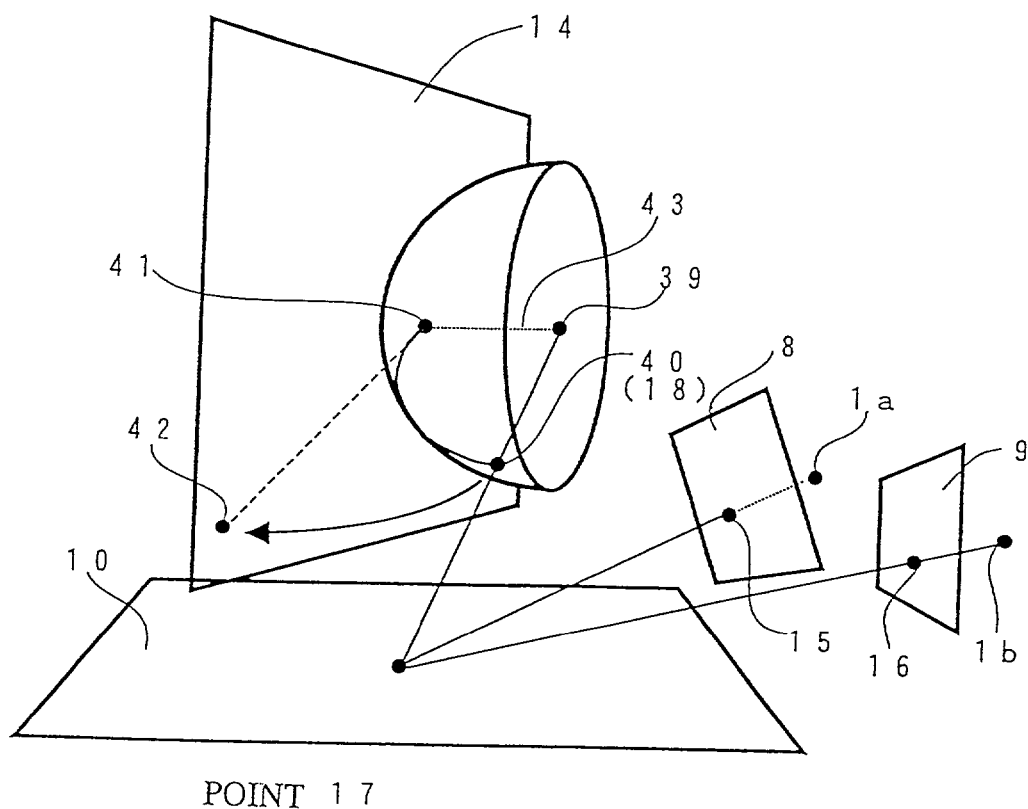
FIGS. 10A and 10B are principle illustrations useful for explaining a procedure to be conducted until a composite picture is acquired according to the fourth embodiment of the present invention.
Figure 10B:
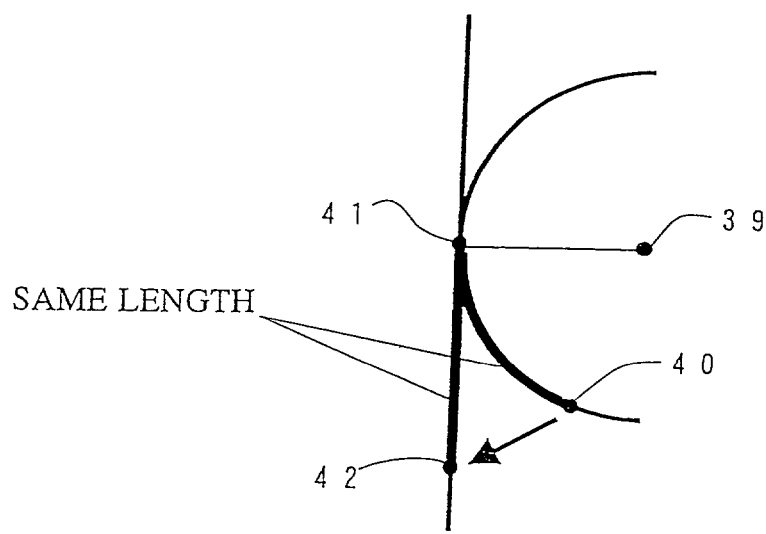

Referring to FIGS. 10A and 10B, a description will be given hereinbelow of a picture composing procedure according to the fourth embodiment. FIG. 10A geometrically and three-dimensionally shows a procedure of spreading or evolving the spherical surface on a plane after the projection to the spherical surface model. As with the first embodiment, an image taken by the image pickup means is plane-projected onto a road surface and further projected to a spherical surface as shown in FIG. 10A. At this time, the projection center 39 is set at the center of the sphere. An image 40 obtained by the projection to the spherical surface is spread round a point 41 on the spherical surface. Through this operation, the image 40 is converted into a point 42. FIG. 10B is a cross-sectional view showing a state in which the spherical surface and the composite picture 14, shown in FIG. 10A, are cut by a plane passing through four points 39, 40, 41 and 42. As shown in this cross-sectional view, the spherical surface spreading section 38 performs the spreading operation so that the length of the circular arc from the point 41 to the point 40 is equal to the length of the straight line from the point 41 to the point 42. The image spread on the picture composing surface 14 in this way becomes a composite picture.

Through this conversion, a straight line existing on a plane including a straight line 43 connecting the point 39 with the point 41 becomes a straight line even on the composite picture. Accordingly, the points 39 and 41 are set so that the straight line 43 becomes parallel to the running direction of the motor vehicle, irrespective of the position of the spherical surface, a straight line parallel to the running direction of the motor vehicle becomes a straight line even on the composite picture, thus providing the effects similar to those of the second embodiment. In addition, when the points 39 and 41 are chosen so that the vehicle body end portion projected onto a road surface 10 and the straight line 43 exist on the same plane, the vehicle body end portion is also projected as a straight line on the composite picture, thus offering the effects similar to those of the third embodiment.

As described above, according to the fourth embodiment of the present invention, a plurality of images taken by the image pickup means are plane-projected onto a road surface, and this plane projection image is projected to a spherical surface, and further the spherical surface projection image is spread over a plane round one point on the spherical surface; therefore, irrespective of variations of the position of the spherical surface, it is possible to project a specific straight line as a straight line on the composite picture by adjusting the center point to be taken at the spreading on the plane.

Fifth Embodiment

Figure 11:
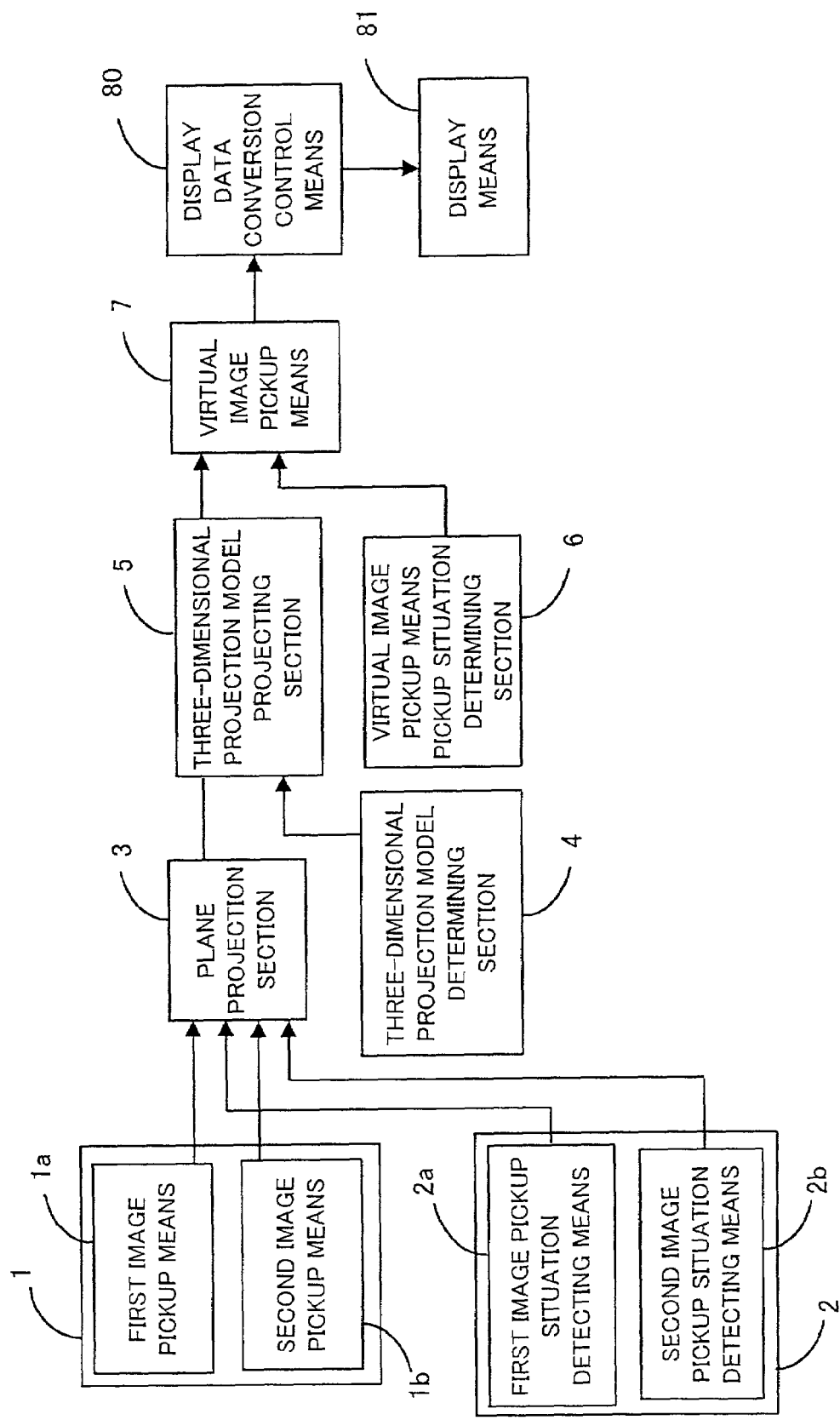
FIG. 11 is a block diagram showing a configuration of an picture displaying apparatus according to a fifth embodiment of the present invention.

FIG. 11 is a block diagram showing a configuration of a picture displaying apparatus according to a fifth embodiment of the present invention. As FIG. 11 shows, a picture displaying apparatus according to a fifth embodiment of the invention comprises, in addition to the above-described configuration, a display data conversion control means 80 and a display means 81, such as a mirror with a display function. The display data conversion control means 80 is for converting an image to be displayed into data adaptable to the display means 81. With this configuration, a picture is displayed on the display function included mirror to allow an operator to easily recognize a surrounding situation or motor vehicle position. As the display function included mirror, there is a first mirror structure in which a half mirror is placed on a surface of a display section of a display means such as a liquid crystal or organic EL (ElectroLuminescence). In this case, it is acceptable that the liquid crystal or organic EL section comprises one display section as a whole or comprises a combination of a plurality of display sections.

In addition, the first mirror structure is switchable between a state acting as an ordinary mirror and a state serving as a picture displaying screen. Still additionally, it can be automatically switched to the picture displaying state by means of an illumination sensor built in the motor vehicle when night comes. Moreover, it is also appropriate that the switching operation is made in response to a headlamp lighting operation by an operator. Still moreover, it is also possible that the switching to the picture displaying state is conducted, for example, by operating a switch for a heat wire in a rear window when the rear window is clouded up due to rain or when the backward becomes invisible due to snow or freezing in winter. Yet moreover, it is also possible that the switching is linked with a gear and the picture displaying state is set only when the gear is set at the back.

Thus, since the whole surface of the mirror can be switched between the ordinary mirror condition and the picture displaying condition, the operator can easily seize the backward situation of the motor vehicle through a wide displaying surface, thereby enabling safe driving.

On the other hand, as a second mirror structure, it is also considered to use both an ordinary mirror and a display section such as a liquid crystal or an organic EL. With this second mirror structure, it is possible that the ordinary mirror section is used for schematically seizing the backward situation while the additionally provided display section displays, in an enlarged state, a portion forming a dead angle in the case of the use of the ordinary mirror section, or enlarges an object portion which particular attention is to be is paid to.

Incidentally, these display means are not limited to the mirrors, but a display section placed on a dash board, a display connected to a navigation system, a portable information terminal, a head-up display or the like is also acceptable.

Sixth Embodiment

Figure 12:
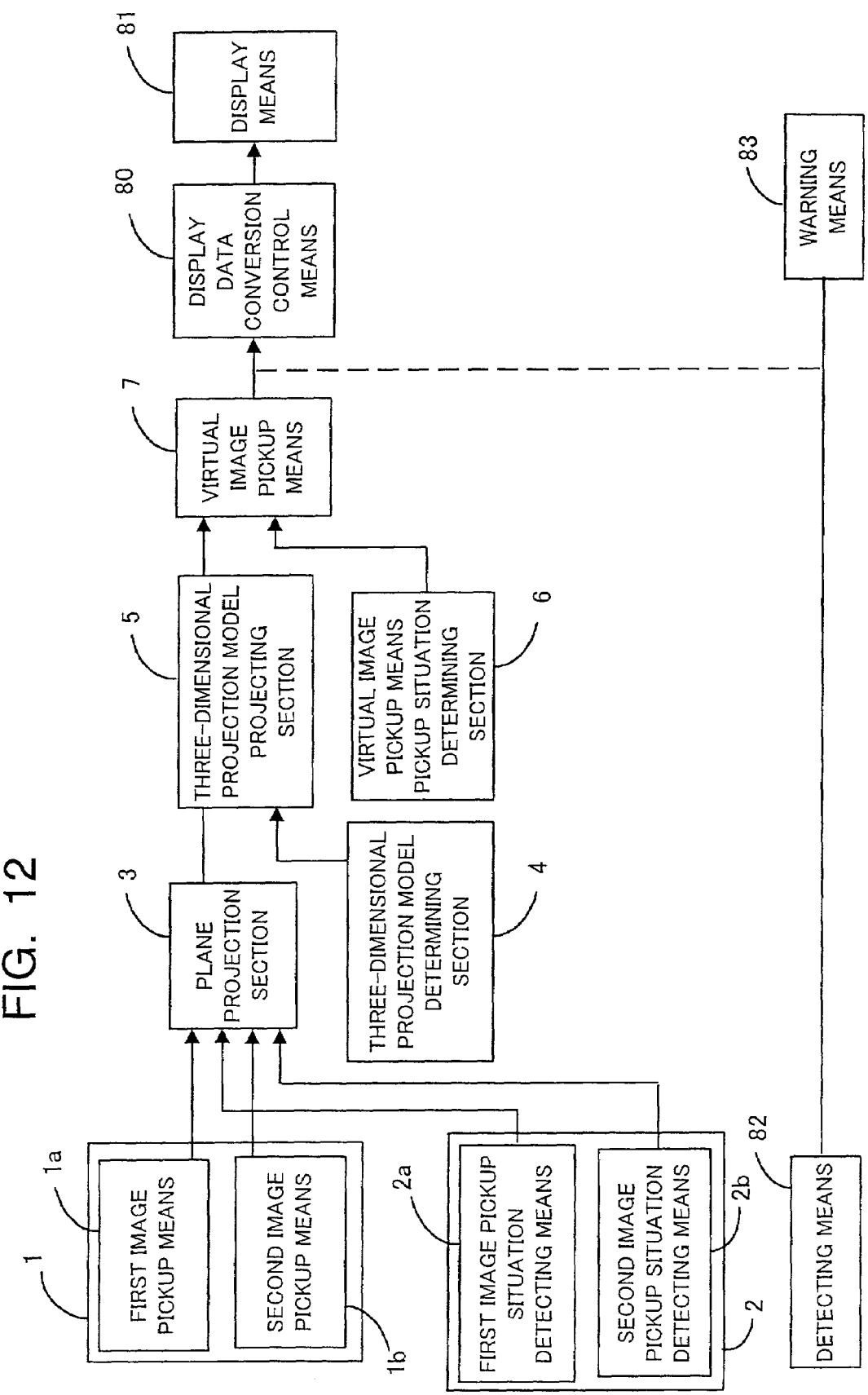
FIG. 12 is a block diagram showing a configuration of a picture acquiring/warning apparatus according to a sixth embodiment of the present invention.

FIG. 12 is a block diagram showing a configuration of a picture acquiring/warning apparatus according to a sixth embodiment of the present invention. As FIG. 12 shows, this picture acquiring/warning apparatus comprises, in addition to the configuration of the picture displaying apparatus shown in FIG. 11, a detecting means 82 and a warning means 83. The detecting means 82 detects, for example, the approach of a camping car forming a coupling object to the motor vehicle through the use of an approach sensor. The detection signal from the detecting means 82 is fed to the warning means 83. Therefore, the driver can seize the approaching state while seeing the picture on the display means 81. In a case in which the camping car is coupled to the motor vehicle through the use of hitches mounted on the motor vehicle side and the camping car side, the warning means 83, such as a speaker, issues a warning sound to the driver when the distance between the hitches on the motor vehicle side and the camping car side reaches 1 m or less and when it reaches below 50 cm. In this case, preferably, the warning means 83 issues different sounds corresponding to the distances between the hitches, respectively. In this way, in the hitch coupling operation, it is possible to properly issue warning in accordance with the approaching state (at the distances set arbitrarily to the coupling operation) while the coupling operation is confirmed through pictures. This enables safe and certain coupling operation.

Incidentally, the warning means 83 is not limited to the speaker, and it is also possible that the warning means 83 is connected to the display data conversion control means 80 as indicated by a dotted line in FIG. 12 to send a warning signal thereto so that a warning symbol image, a flash image, a color suitable for giving attention, or the like is superimposed on a picture on the display means 81. In addition, the condition on the issue of the warning information can arbitrarily be determined on the basis of the size, weight, speed or the like of the motor vehicle or coupling object.

Still additionally, the image pickup means can also be mounted on the hitch to confirm the complete coupling. Yet additionally, as the display image, an output of the plane projection section 3 or a combination of the output of the plane projection section 3 and an image from the virtual image pickup means 7 can also be used, in place of the image from the virtual image pickup means 7.

Moreover, the detecting means can be of an ultrasonic type, an electromagnetic type, an optical (including infrared) type or the like. Still moreover, it is also possible to use a type directly calculating a distance from an image for warning.

Although the coupling object has been mentioned as being a camping car, this embodiment is also applicable to other objects such as a carriage for carrying a boat.

Seventh Embodiment

Figure 13:
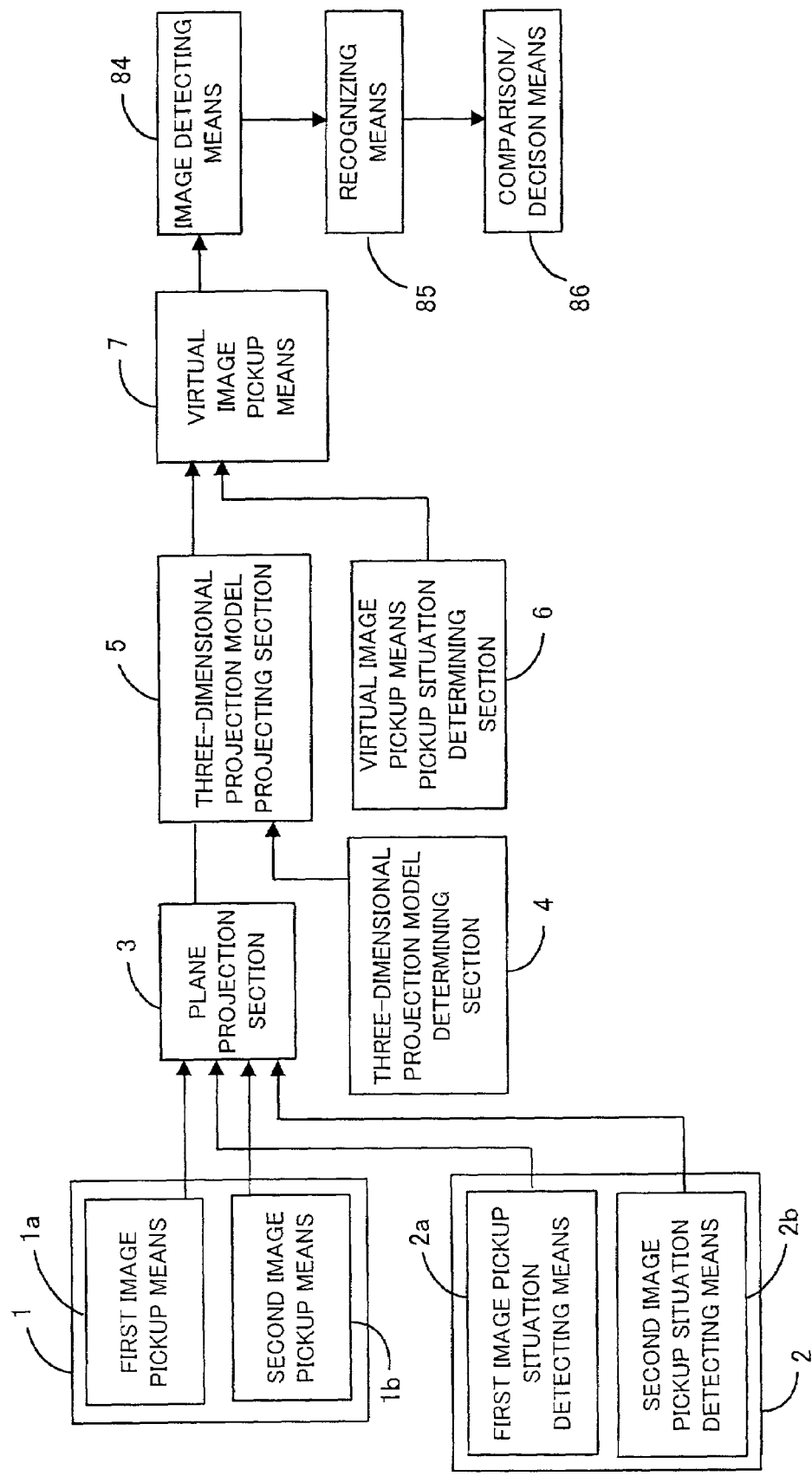
FIG. 13 is a block diagram showing a configuration of an owning motor vehicle recognition/decision apparatus according to a seventh embodiment of the present invention.

FIG. 13 is a block diagram showing a configuration of a motor vehicle position recognition/decision apparatus according to a seventh embodiment of the present invention. As FIG. 13 shows, the motor vehicle position recognition/decision apparatus according to a seventh embodiment of the invention comprises, in addition to the configuration shown in FIG. 1, an image detecting means 84, a recognizing means 85 and a comparison/decision means 86.

The image detecting means 84 is for, when at least one of the plurality of image pickup means is a backward image pickup means placed on a rear side of a motor vehicle, detecting an image of an arbitrary object from images taken by the backward image pickup means, projected images thereof or combined images thereof. The recognizing means is for recognizing a positional relationship between the image detected by the image detecting means and an image of a motor vehicle. The comparison/decision means is for making a comparison/decision with respect to an arbitrarily set condition. More concretely, in the motor vehicle position recognition/decision apparatus according to this embodiment, a camera(s) acting as a backward image pickup means mounted at a rear side of the motor vehicle picks up images of white lines of a parking space, and the image detecting means detects the images of the white lines from the picked-up images, images obtained by projecting the picked-up images to a three-dimensional projection model based on a combination of a cylindrical surface and a spherical surface, or a composite image produced by the virtual image pickup means 7. In addition, the recognizing means 85 calculates and recognizes the positional relationship between the white lines detected by the image detecting means 84 and the image of the motor vehicle on the basis of the image data from the image detecting means 84, and the comparison/decision means 86 makes a comparison/decision on a difference between the motor vehicle and the white lines on the basis of the positional relationship calculated by the recognizing means 85 (making a comparison/decision on the basis of the image positions or the recognition data obtained by the recognizing means) so that the motor vehicle is situated between the right and left white lines.

With this configuration, the driver can easily seize the positional relationship on the motor vehicle in addition to the backward and surrounding situations, thus enabling safe driving.

It should be understood that the present invention is not limited to the above-described embodiments, and that it is intended to cover all changes and modifications of the embodiments of the invention herein which do not constitute departures from the spirit and scope of the invention.

What is claimed is:

1. A picture composing apparatus comprising:
a plurality of image pickup means;
image pickup situation detecting means for detecting an image pickup situation of said image pickup means;
first projecting means for projecting a plurality of images taken by said image pickup means onto a projection section in accordance with the image pickup situation detected by said image pickup situation detecting means to generate a plurality of first projected images;
second projecting means for projecting said plurality of first projected images to a three-dimensional projection model to generate a second projected image;
virtual image pickup means for virtually picking up said second projected image;
three-dimensional projection model determining means for determining a position of said three-dimensional projection model and a shape thereof; and
pickup situation determining means for determining an image pickup situation of said virtual image pickup means,
said second projected image being picked up by said virtual image pickup means in the image pickup situation determined by said pickup situation determining means to combine the plurality of images taken by said plurality of image pickup means.

2. The picture composing apparatus according to claim 1, wherein said image pickup situation detecting means previously detects at least one of a position, posture and image pickup characteristic of said image pickup means with respect to said projection section.

3. The picture composing apparatus according to claim 1, wherein said first projecting means projects points on the images taken by said image pickup means to said projection section through the use of a transformation matrix obtained by associating a plurality of points on the taken images with a plurality of points on said projection section.

4. The picture composing apparatus according to claim 1, wherein said projection section is substantially a plane.

5. The picture composing apparatus according to claim 1, wherein said three-dimensional projection model is a spherical surface.

6. The picture composing apparatus according to claim 1, wherein said three-dimensional projection model is a combination of a plurality of surfaces different in shape from each other.

7. The picture composing apparatus according to claim 6, wherein said three-dimensional projection model is a combination of a plane and a cylinder, and when said second projecting means conducts the projection to said three-dimensional projection model, a distant place is projected to said cylinder and the other place is projected to said plane and said virtual image pickup means picks up the projected image.

8. The picture composing apparatus according to claim 6, wherein said plurality of surfaces different in shape are combined so that a joint therebetween does not stand out.

9. The picture composing apparatus according to claim 6, wherein said three-dimensional projection model is a combination of a sphere and a cylinder, and when said second projecting means conducts the projection to said three-dimensional projection model, a distant place is projected to said cylinder and the other place is projected to said sphere and said virtual image pickup means picks up the projected image.

10. The picture composing apparatus according to claim 8, wherein said three-dimensional projection model is a combination of three types of surfaces of a cylinder, a plane and a curved surface establishing smooth boundary between said cylinder and said plane.

11. The picture composing apparatus according to claim 1, wherein a line segment on the image taken by said image pickup means is converted into a straight line on a composite picture.

12. The picture composing apparatus according to claim 1, wherein said plurality of image pickup means are mounted on a motor vehicle, and motor vehicle running direction detecting means is further provided to detect a running direction of said motor vehicle.

13. The picture composing apparatus according to claim 12, wherein a position of a viewing point of said virtual image pickup means is set on a straight line passing through a projection center of said second projecting means in parallel with the running direction of said motor vehicle.

14. The picture composing apparatus according to claim 12, wherein a line segment representative of the running direction of said motor vehicle is converted into a straight line on a composite picture.

15. The picture composing apparatus according to claim 1, wherein said plurality of image pickup means are mounted on a motor vehicle, and motor vehicle body position detecting means is further provided to detect a body position of said motor vehicle.

16. The picture composing apparatus according to claim 15, wherein a position of a viewing point of said virtual image pickup means is set on a plane passing through an image obtained by plane-projecting an end portion of said body of said motor vehicle and a projection center of said second projecting means.

17. The picture composing apparatus according to claim 11, wherein said image pickup means is mounted on a rear end portion of a motor vehicle, and rear end portion of said motor vehicle is converted into a straight line on a composite picture.

18. The picture composing apparatus according to claim 11, wherein said image pickup means is mounted on a side portion of a motor vehicle, and said side portion of said motor vehicle is converted into a straight line on a composite picture.

19. The picture composing apparatus according to claim 11, wherein said image pickup means is mounted on a side portion of a motor vehicle, and a center line of a lane adjacent to a lane said motor vehicle is running on is converted into a straight line on a composite picture.

20. The picture composing apparatus according to claim 11, wherein said image pickup means is mounted on a rear portion of a motor vehicle, and a center line of a road perpendicular to a road said motor vehicle is running on is converted into a straight line on a composite picture.

21. The picture composing apparatus according to claim 11, wherein said image pickup means is mounted on a front portion of a motor vehicle, and a center line of a road perpendicular to a road said motor vehicle is running on is converted into a straight line on a composite picture.

22. A picture composing apparatus comprising:
a plurality of image pickup means;
image pickup situation detecting means for detecting an image pickup situation of said image pickup means;
first projecting means for projecting a plurality of images taken by said image pickup means onto a projection surface in accordance with the image pickup situation detected by said image pickup situation detecting means to generate a plurality of first projected images;
second projecting means for projecting the plurality of first projected images to a spherical surface to generate a second projected image; and
converting means for spreading the second projected image on a plane round one point on said spherical surface.

23. A picture composing method comprising:
an image pickup step of picking up a plurality of images;
an image pickup situation detecting step of detecting an image pickup situation in said image pickup step;
a first projecting step of projecting a plurality of images picked up to a projection section in accordance with the image pickup situation detected in said image pickup situation detecting step to generate a plurality of first projected images;
a second projecting step of projecting the plurality of first projected images to a three-dimensional projection model to generate a second projected image;
a virtual image pickup step of virtually picking up the second projected image;
a three-dimensional projection model determining step of determining a position of said three-dimensional projection model and a shape thereof; and
an image pickup situation determining step of determining the image pickup situation in said virtual image pickup step,
the second projected image being picked up in said virtual image pickup step in the projection situation determined in said image pickup situation determining step to combine the plurality of images taken in said image pickup step.

24. A picture composing method according to claim 23, further comprising a step of sending signal information from motor vehicle running direction detecting means, which detects a running direction of a motor vehicle, to image pickup situation determining means used for said image pickup situation determining step.

25. A picture composing method according to claim 23, further comprising a step of sending signal information from motor vehicle body position detecting means, which detects a body position of a motor vehicle, to image pickup situation determining means used for said image pickup situation determining step.

26. A picture composing method comprising:
an image pickup step of picking up a plurality of images;
an image pickup situation detecting step of detecting an image pickup situation in said image pickup step;
a first projecting step of projecting a plurality of images, picked up in said image pickup step, to a projection section in accordance with the image pickup situation detected in the image pickup situation detecting step, to generate a plurality of first projected images;
a second projecting step of projecting the plurality of first projected images to a spherical surface to generate a second projected image;
a plane spreading step of spreading the second projected image on a plane round one point on said spherical surface; and
a spherical surface position determining step of determining a position of said spherical surface,
a plurality of images obtained in said plane spreading step are combined to produce a composite picture.

* * * * *